United States Patent
Snider et al.

(10) Patent No.: US 11,746,582 B2
(45) Date of Patent: Sep. 5, 2023

(54) SLIDER WINDOW ASSEMBLY WITH MOVABLE PANEL DRIVE SYSTEM

(71) Applicant: Magna Mirrors of America, Inc., Holland, MI (US)

(72) Inventors: Darin J. Snider, Holland, MI (US); Kyle S. Bowman, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 112 days.

(21) Appl. No.: 17/443,975

(22) Filed: Jul. 29, 2021

(65) Prior Publication Data

US 2021/0355737 A1 Nov. 18, 2021

Related U.S. Application Data

(62) Division of application No. 16/438,513, filed on Jun. 12, 2019, now abandoned.

(60) Provisional application No. 62/684,948, filed on Jun. 14, 2018.

(51) Int. Cl.
*E05F 15/655* (2015.01)
*B60J 1/18* (2006.01)
*E05D 15/06* (2006.01)

(52) U.S. Cl.
CPC .......... *E05F 15/655* (2015.01); *B60J 1/1853* (2013.01); *E05D 15/0621* (2013.01); *E05Y 2900/55* (2013.01)

(58) Field of Classification Search
CPC ..... E05F 15/655; E05F 15/635; B60J 1/1853; E05Y 2201/662
See application file for complete search history.

(56) References Cited

U.S. PATENT DOCUMENTS

| | | | | |
|---|---|---|---|---|
| 3,917,502 A | * | 11/1975 | Shirasaka | B29D 29/00 156/353 |
| 4,674,231 A | * | 6/1987 | Radek | E05F 15/60 49/118 |
| 4,920,698 A | * | 5/1990 | Friese | E05F 15/662 49/362 |
| 4,995,195 A | | 2/1991 | Olberding et al. | |
| 5,146,712 A | * | 9/1992 | Hlavaty | E05F 15/655 49/118 |

(Continued)

FOREIGN PATENT DOCUMENTS

EP 881409 A1 * 12/1998 ............ E05F 15/619

*Primary Examiner* — Marcus Menezes
(74) *Attorney, Agent, or Firm* — HONIGMAN LLP

(57) ABSTRACT

A vehicular slider window assembly includes a frame portion having an upper rail and a lower rail, a fixed window panel, and a movable window panel that is movable along the rails between an opened position and a closed position. A drive system is operable to move the movable window panel between the opened position and the closed position. The drive system includes a single flexible drive element that, when the drive system is actuated to move the window panel in one direction, the flexible drive element pulls the movable window panel along the rails, and when the drive system is actuated to move the window panel in the opposite direction, the flexible drive element pushes the movable window panel along the rails. The lower rail includes guide structure that limits flexing of the flexible drive element when the flexible drive element pushes the movable window panel along the rails.

18 Claims, 30 Drawing Sheets

(56) References Cited

U.S. PATENT DOCUMENTS

| | | | | |
|---|---|---|---|---|
| 5,531,046 A | * | 7/1996 | Kollar | B60J 1/1853 49/362 |
| 5,557,888 A | | 9/1996 | Ruchat et al. | |
| 5,572,376 A | | 11/1996 | Pace | |
| 5,644,869 A | | 7/1997 | Buchanan, Jr. | |
| 5,669,181 A | * | 9/1997 | Kollar | B60J 1/1853 49/362 |
| 5,784,833 A | * | 7/1998 | Sponable | E05F 15/643 49/130 |
| 5,799,444 A | | 9/1998 | Freimark et al. | |
| 5,822,922 A | | 10/1998 | Grumm et al. | |
| 5,826,377 A | | 10/1998 | Simson et al. | |
| 5,996,284 A | | 12/1999 | Freimark et al. | |
| 6,018,913 A | | 2/2000 | Lin | |
| 6,021,605 A | * | 2/2000 | Laux | E05F 15/643 49/121 |
| 6,026,611 A | | 2/2000 | Ralston et al. | |
| 6,038,819 A | | 3/2000 | Klein | |
| 6,112,462 A | | 9/2000 | Kolar | |
| 6,119,401 A | | 9/2000 | Lin et al. | |
| 6,119,402 A | | 9/2000 | Wisner | |
| 6,560,929 B1 | | 5/2003 | Staser et al. | |
| 6,591,552 B1 | | 7/2003 | Rasmussen | |
| 6,691,464 B2 | | 2/2004 | Nestell et al. | |
| 6,810,622 B2 | | 11/2004 | Oberheide | |
| 6,918,208 B2 | | 7/2005 | Oberheide et al. | |
| 6,955,009 B2 | | 10/2005 | Rasmussen | |
| 7,003,916 B2 | | 2/2006 | Nestell et al. | |
| 7,073,293 B2 | | 7/2006 | Galer | |
| 7,185,943 B2 | * | 3/2007 | Lesle | E05F 15/652 296/146.16 |
| 7,410,201 B1 | | 8/2008 | Wilson et al. | |
| 7,584,574 B2 | | 9/2009 | Kinross et al. | |
| RE41,502 E | | 8/2010 | Neaux | |
| 7,861,462 B2 | | 1/2011 | Smith et al. | |
| 8,151,519 B2 | | 4/2012 | Bello et al. | |
| 8,240,087 B2 | | 8/2012 | Kinross | |
| 8,402,695 B2 | | 3/2013 | Smith et al. | |
| 8,474,186 B2 | | 7/2013 | Dufour et al. | |
| 8,510,993 B2 | * | 8/2013 | Mellary | B60J 1/1853 49/380 |
| 8,813,425 B2 | | 8/2014 | Ash, Jr. et al. | |
| 8,881,458 B2 | | 11/2014 | Snider et al. | |
| 8,915,018 B2 | | 12/2014 | Snider | |
| 8,935,887 B2 | | 1/2015 | Cavalcante | |
| 8,938,914 B2 | | 1/2015 | Hulst et al. | |
| 9,160,220 B2 | | 10/2015 | Cavalcante | |
| 9,518,420 B2 | | 12/2016 | Kondo | |
| 9,579,956 B2 | | 2/2017 | Sudou et al. | |
| 10,501,977 B2 | | 12/2019 | Snider et al. | |
| 10,524,313 B2 | * | 12/2019 | Snider | B32B 17/061 |
| 2002/0148163 A1 | | 10/2002 | Warner et al. | |
| 2003/0213179 A1 | | 11/2003 | Galer | |
| 2004/0020131 A1 | | 2/2004 | Galer et al. | |
| 2006/0107600 A1 | | 5/2006 | Nestell et al. | |
| 2007/0234644 A1 | | 10/2007 | Jaeger et al. | |
| 2008/0127563 A1 | | 6/2008 | Tooker | |
| 2008/0163553 A1 | | 7/2008 | Liao | |
| 2008/0229667 A1 | | 9/2008 | Dufour et al. | |
| 2009/0025296 A1 | | 1/2009 | Petner | |
| 2010/0263290 A1 | | 10/2010 | Pawloski et al. | |
| 2011/0120019 A1 | | 5/2011 | Smith et al. | |
| 2017/0356231 A1 | | 12/2017 | Snider et al. | |
| 2019/0299762 A1 | | 10/2019 | Hiramatsu | |
| 2019/0383084 A1 | | 12/2019 | Snider et al. | |

* cited by examiner

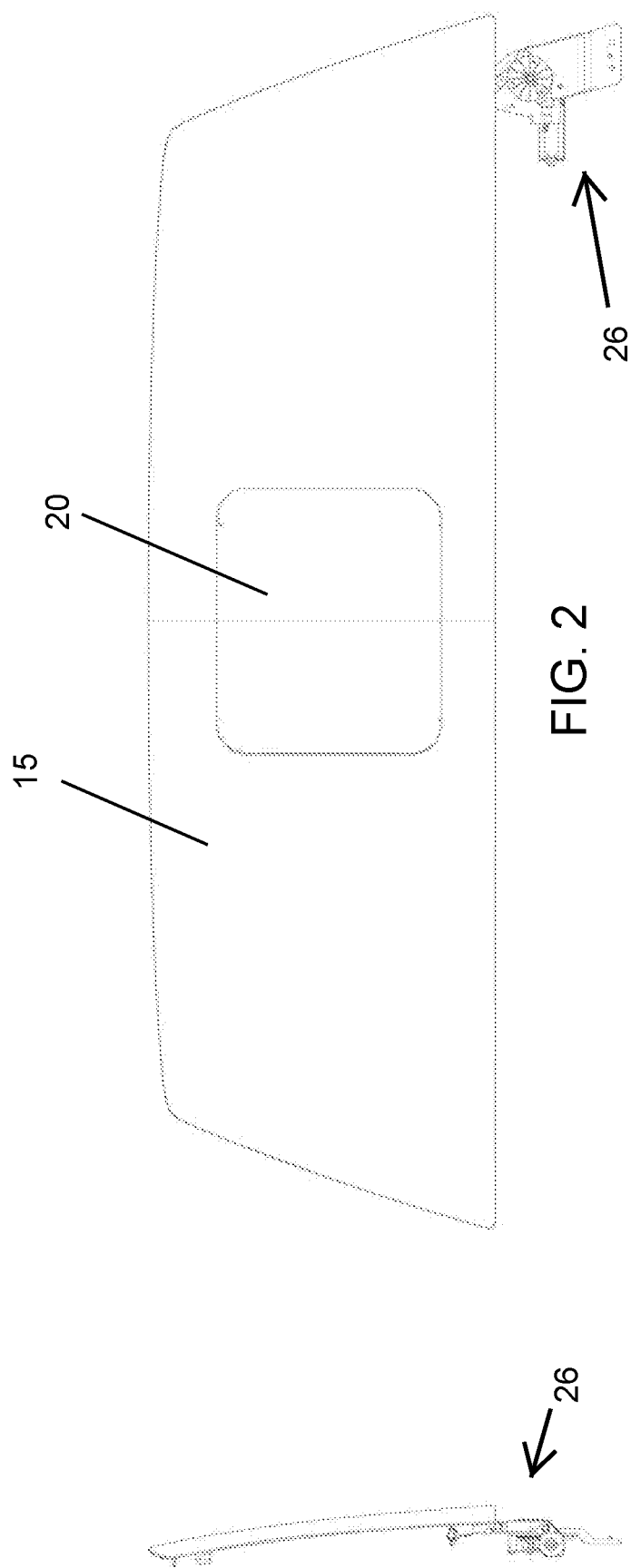
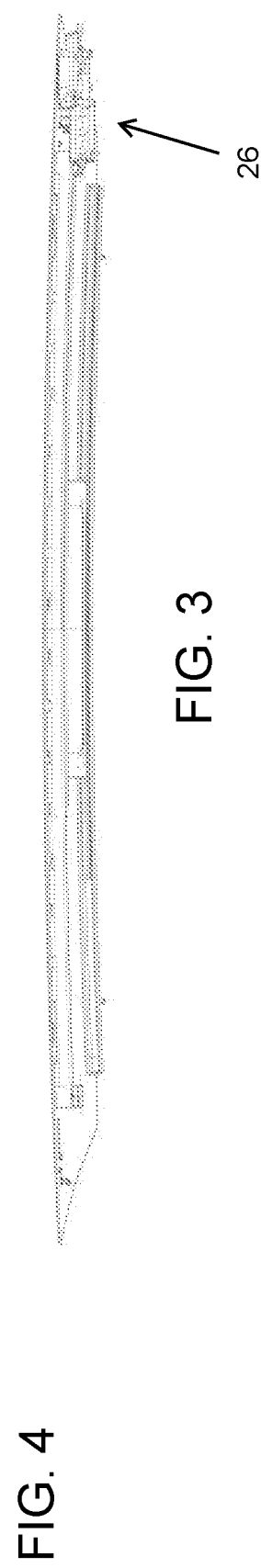

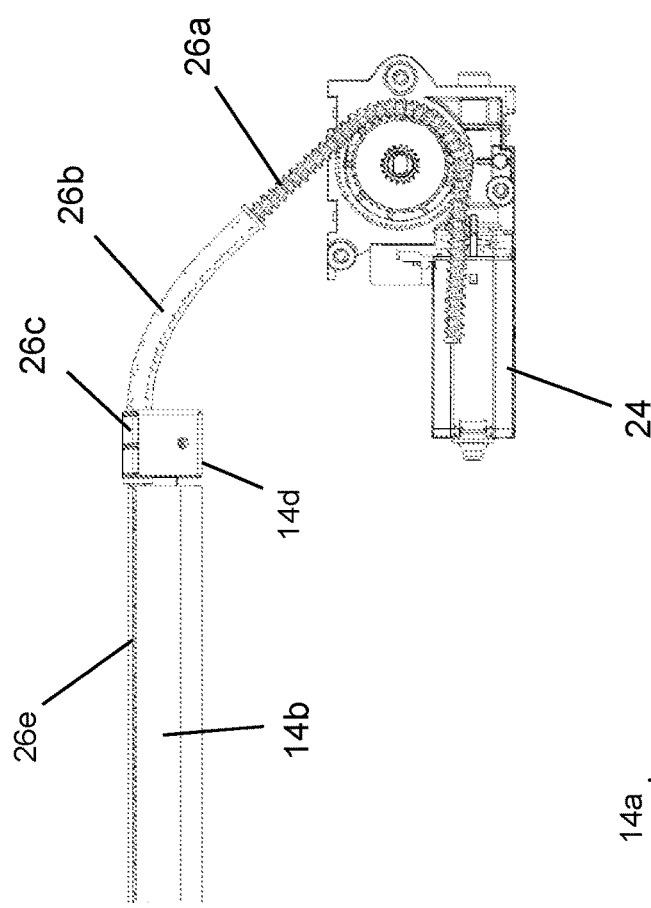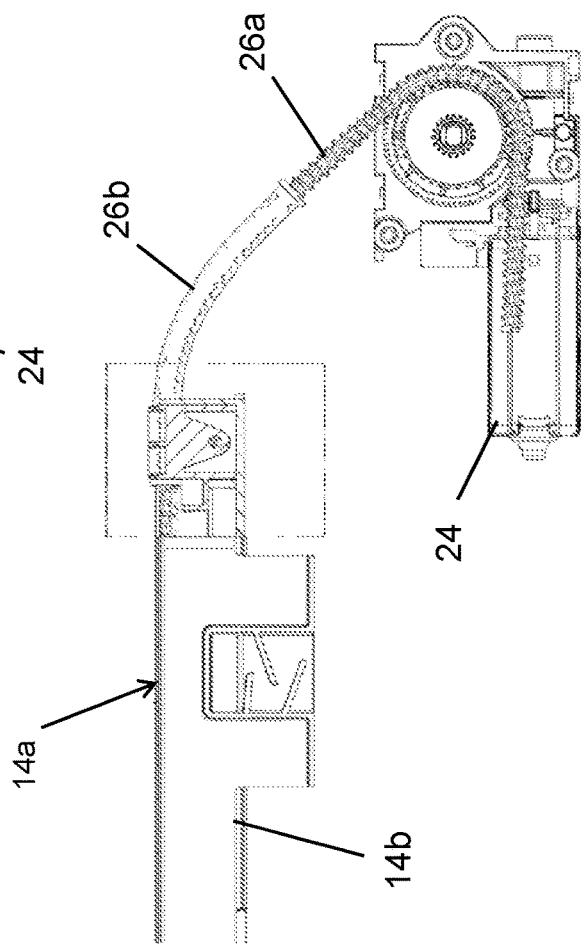

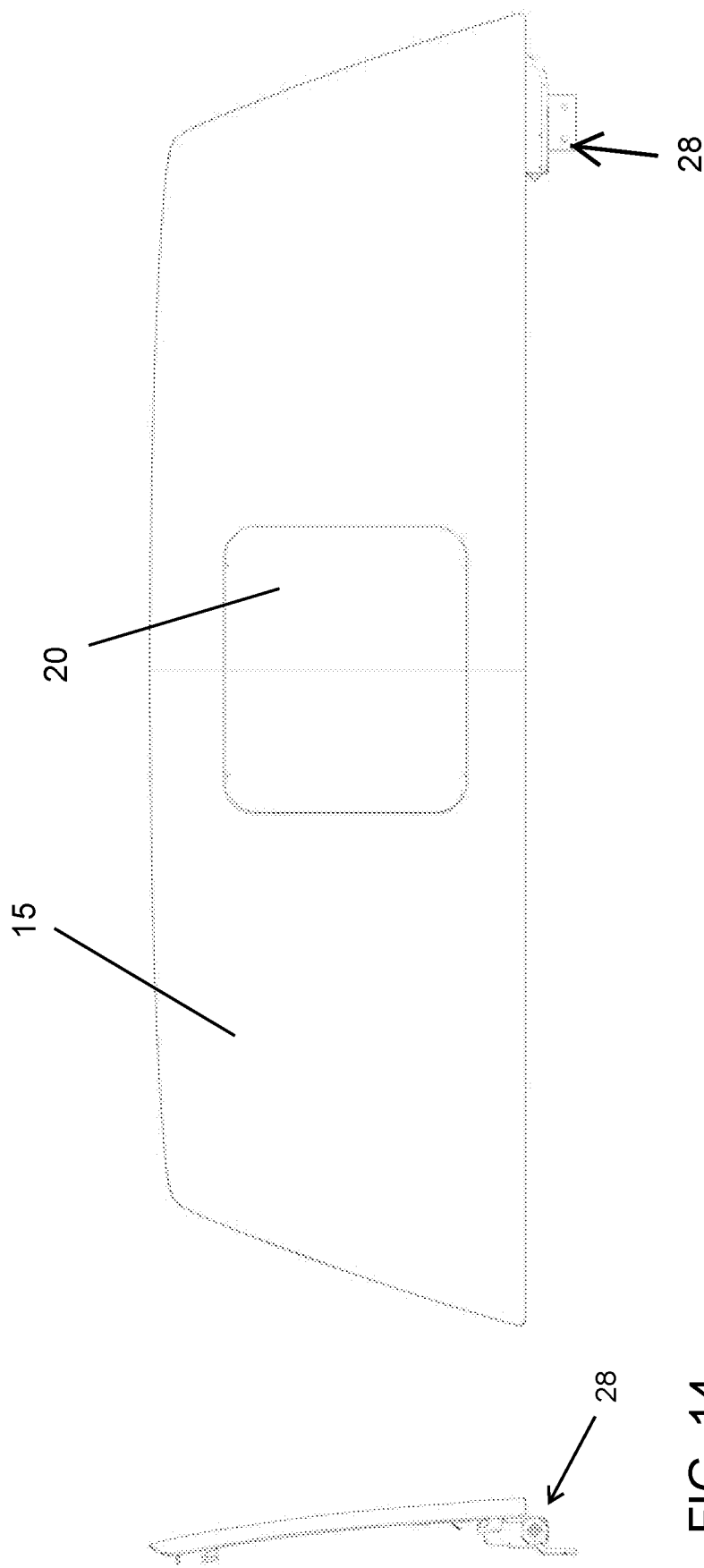

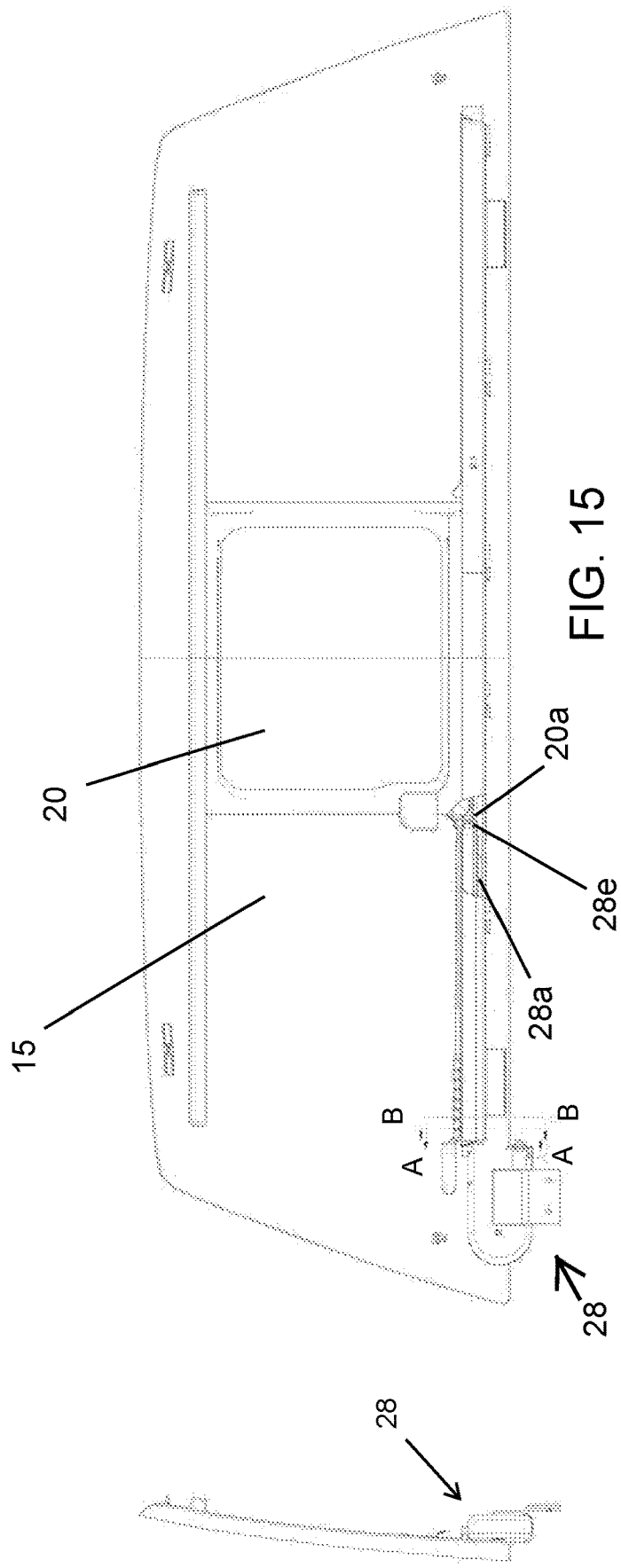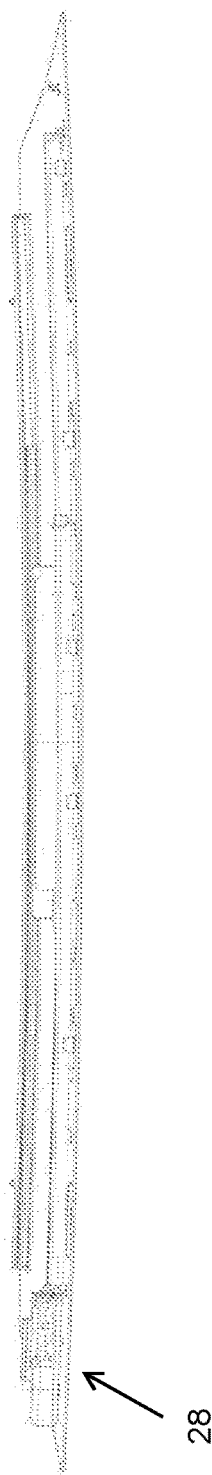

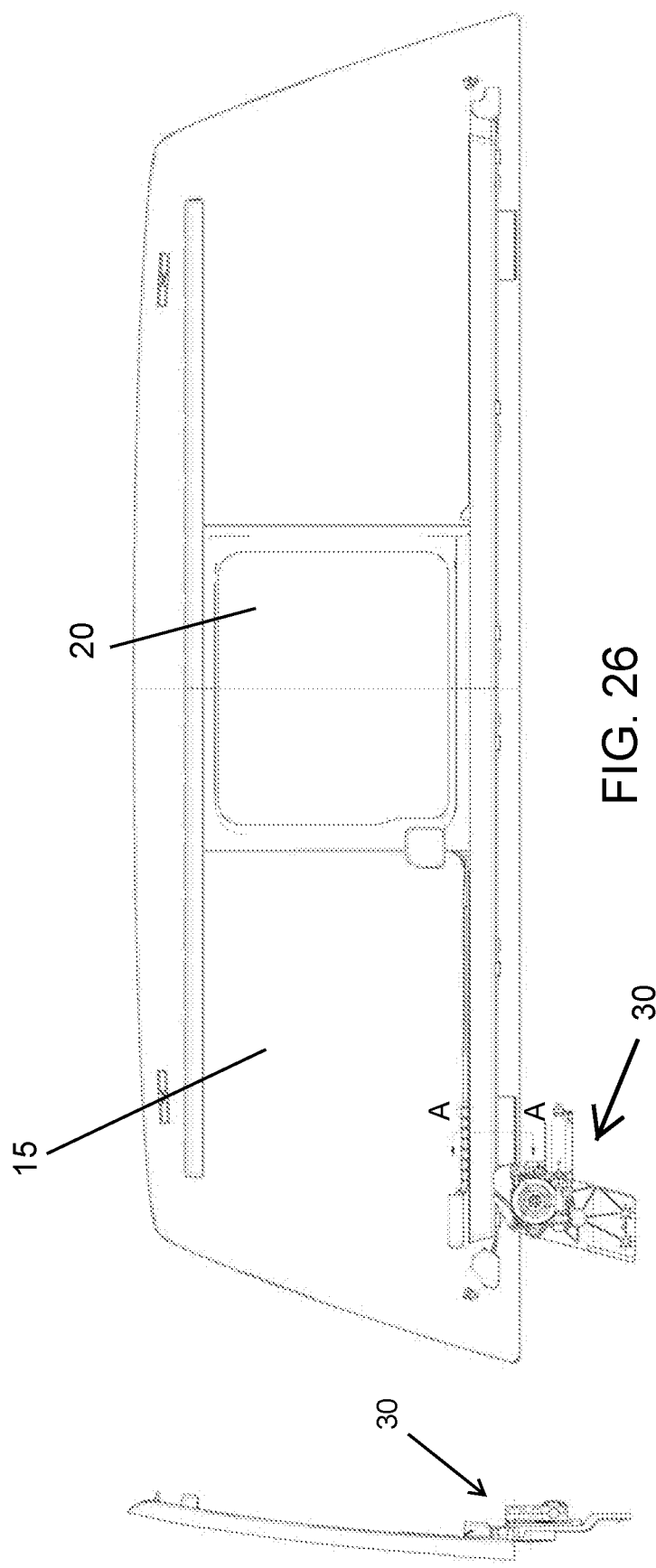
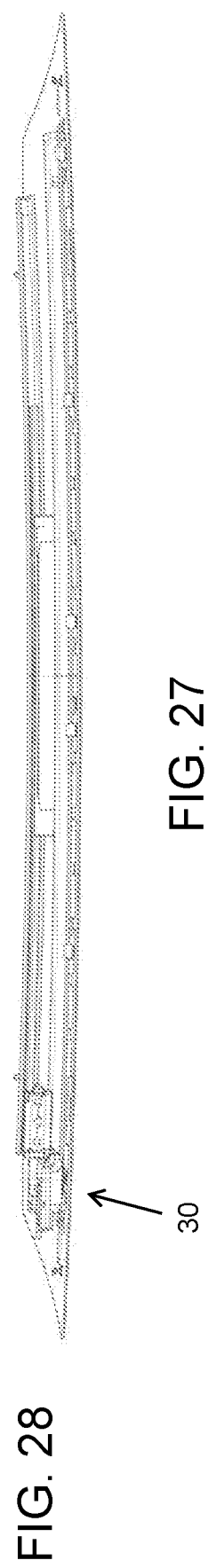
FIG. 26
FIG. 27
FIG. 28

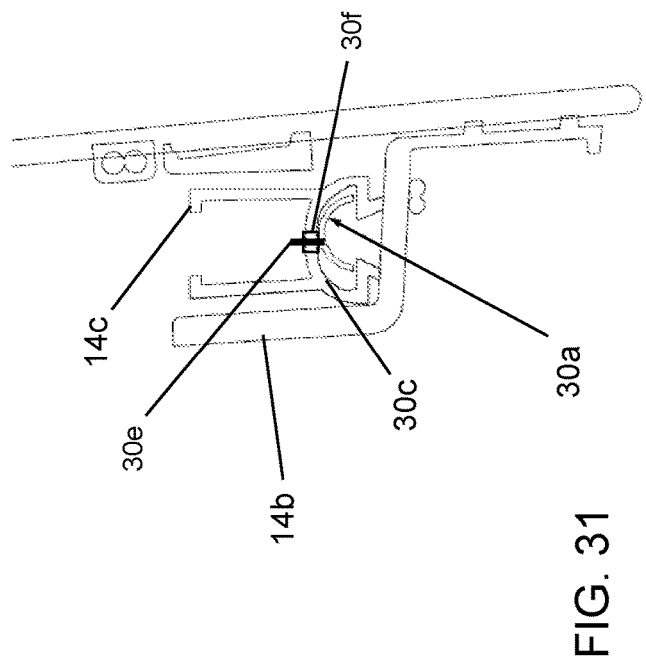
FIG. 29
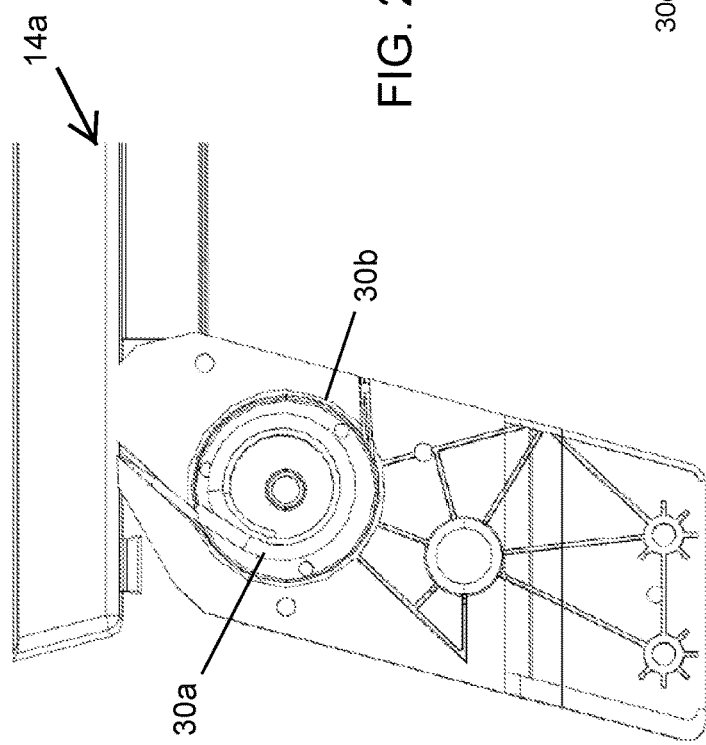
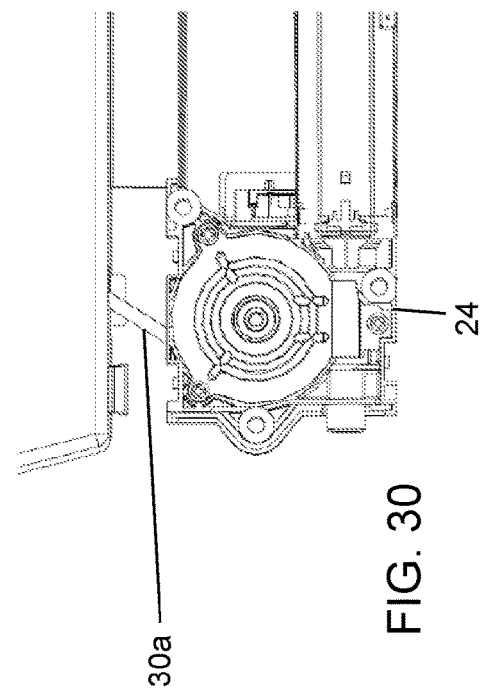
FIG. 31
FIG. 30

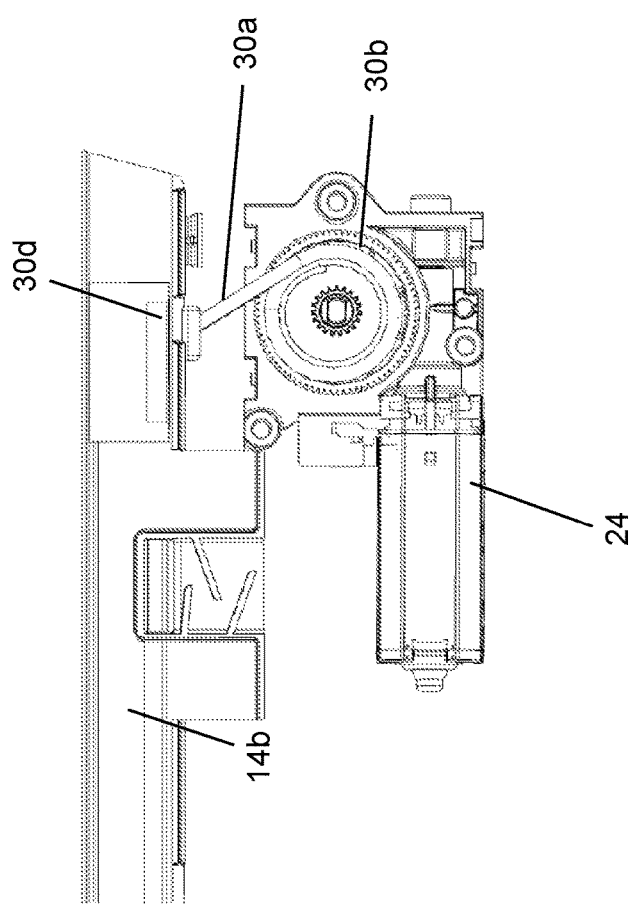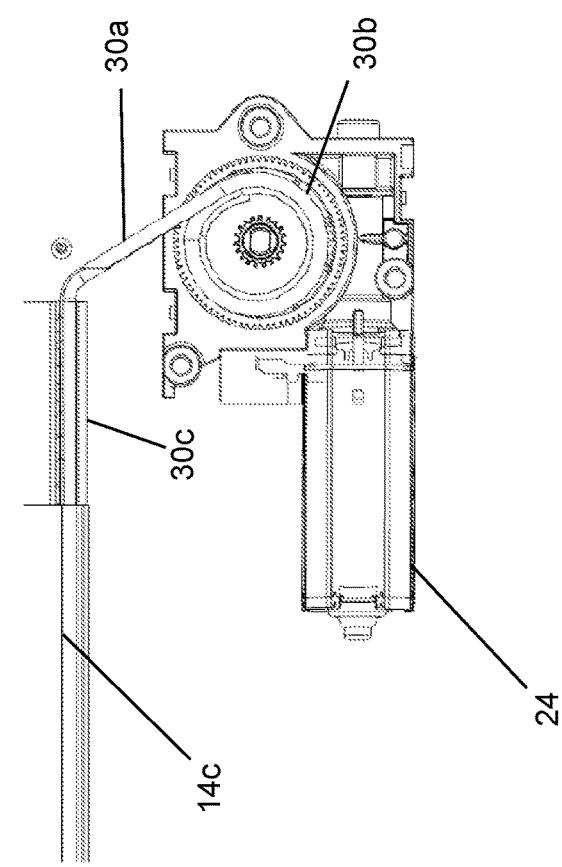

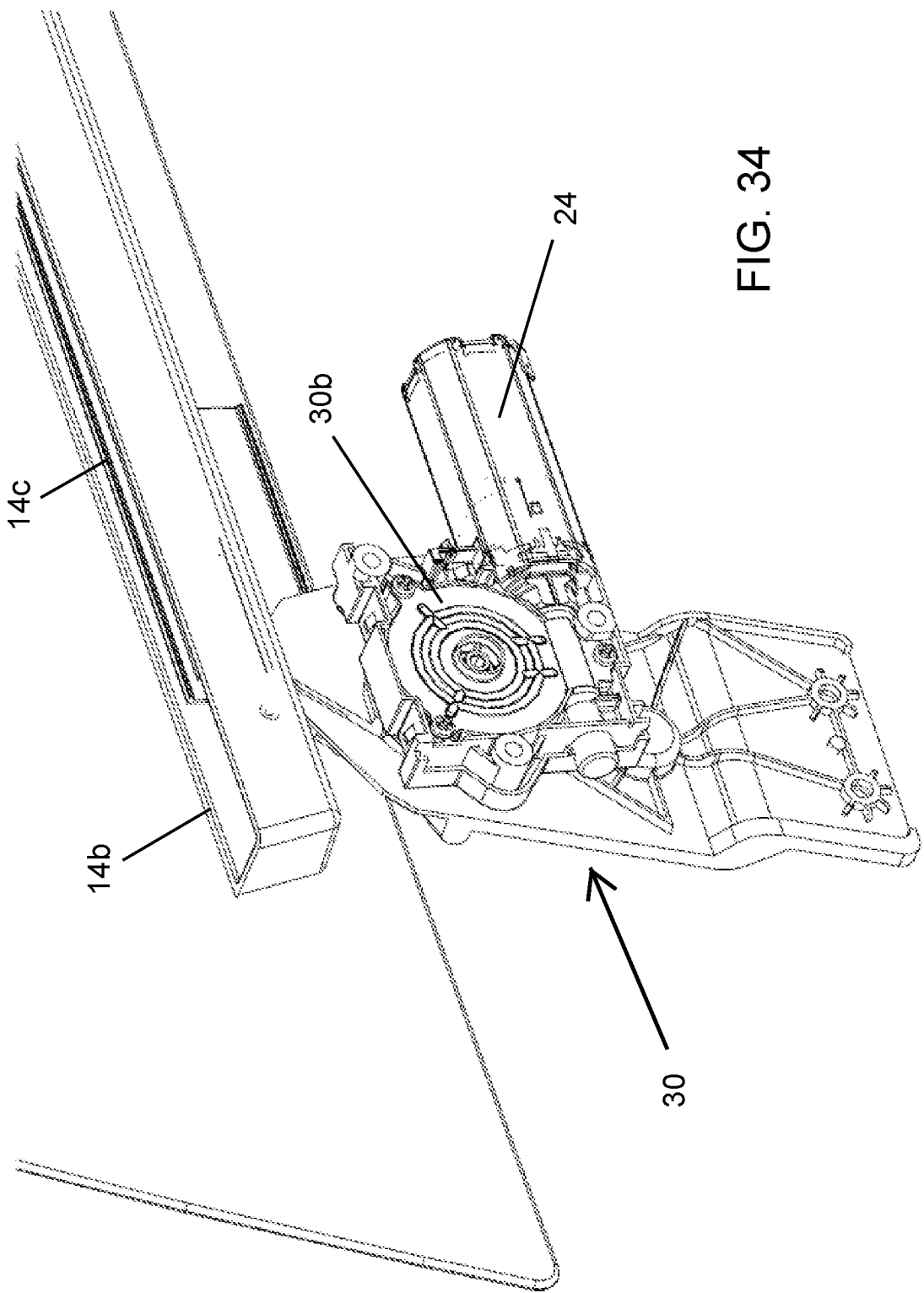

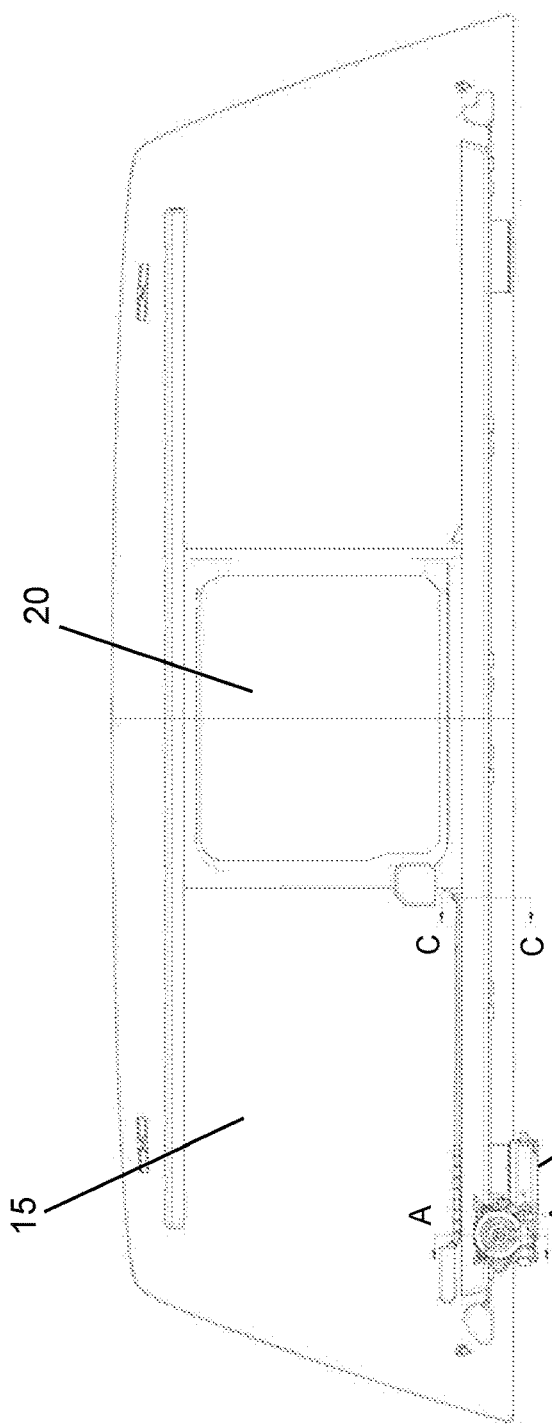
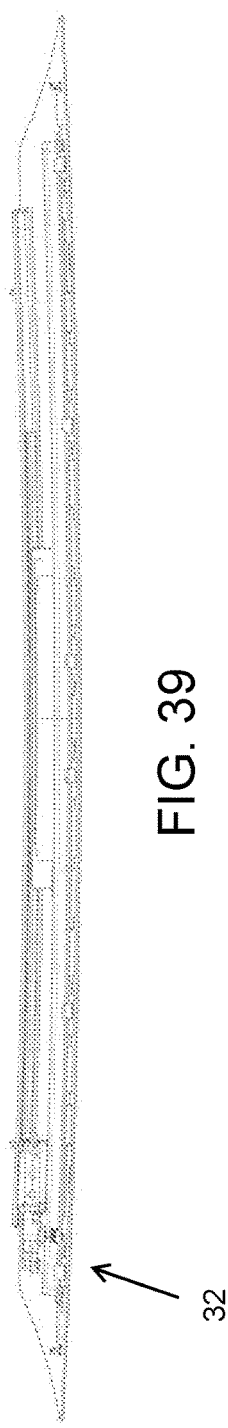
FIG. 38
FIG. 39
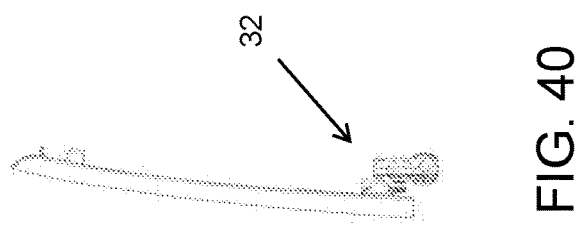
FIG. 40

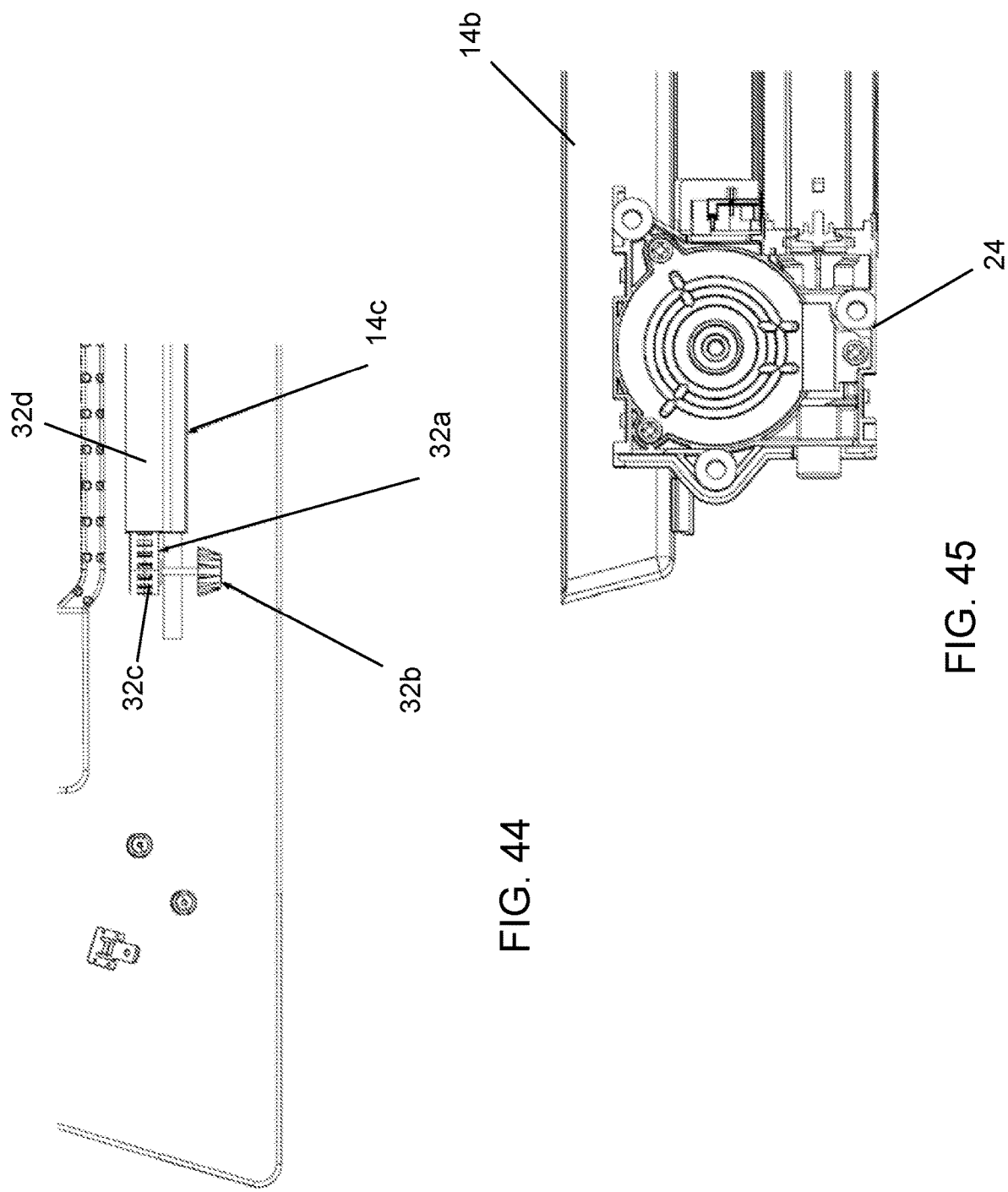

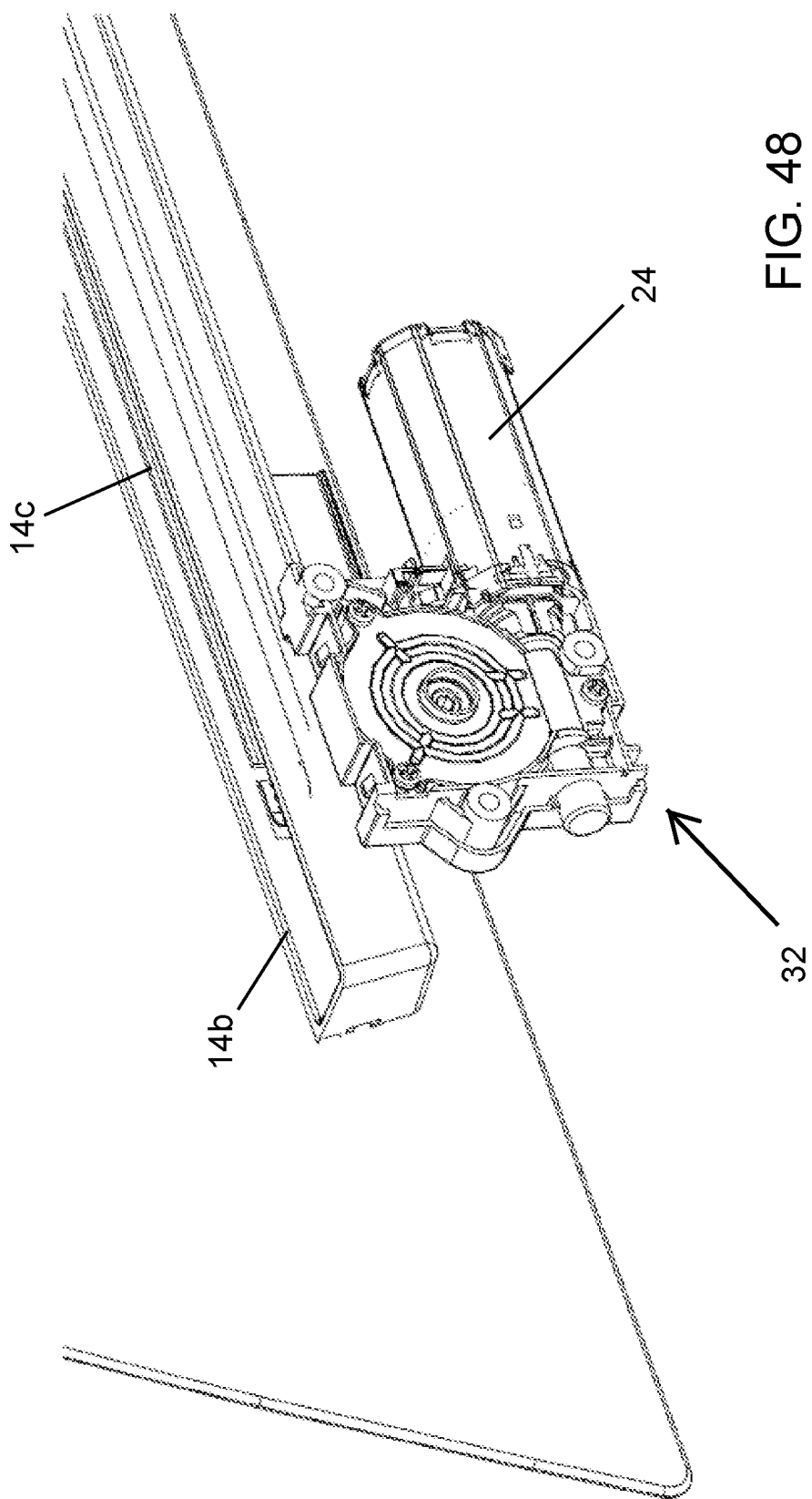

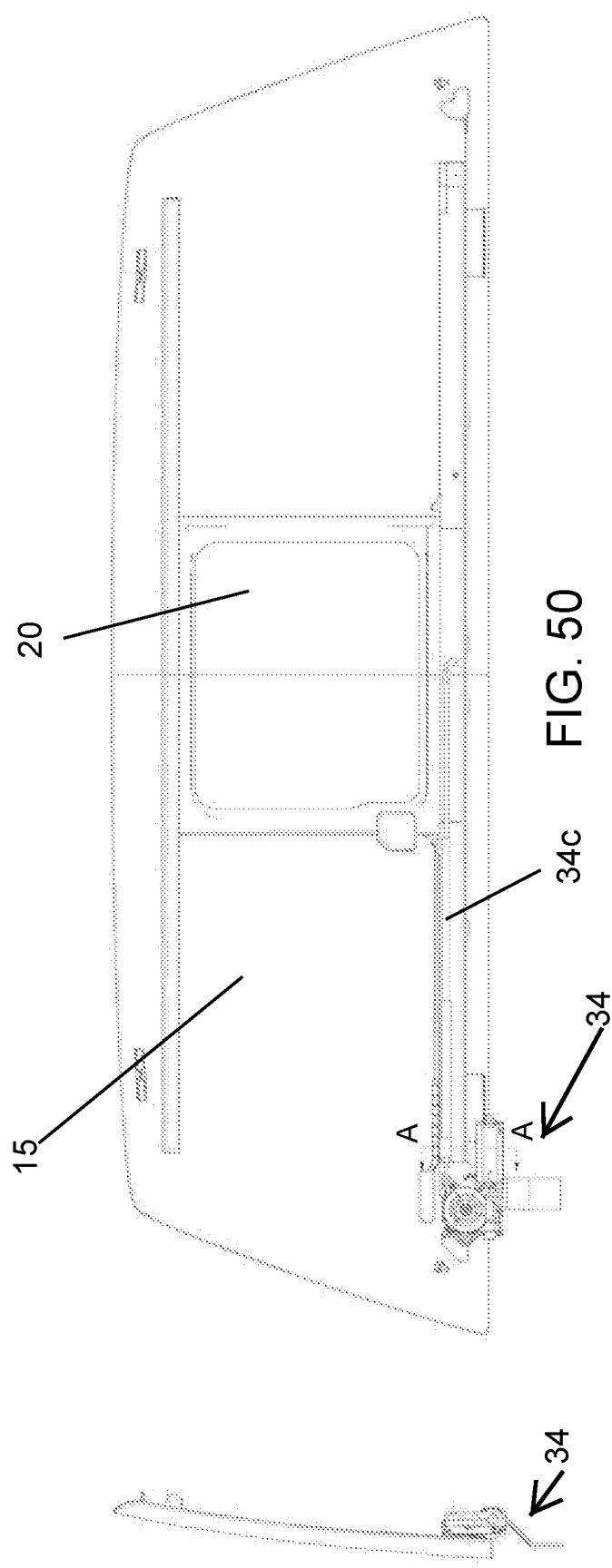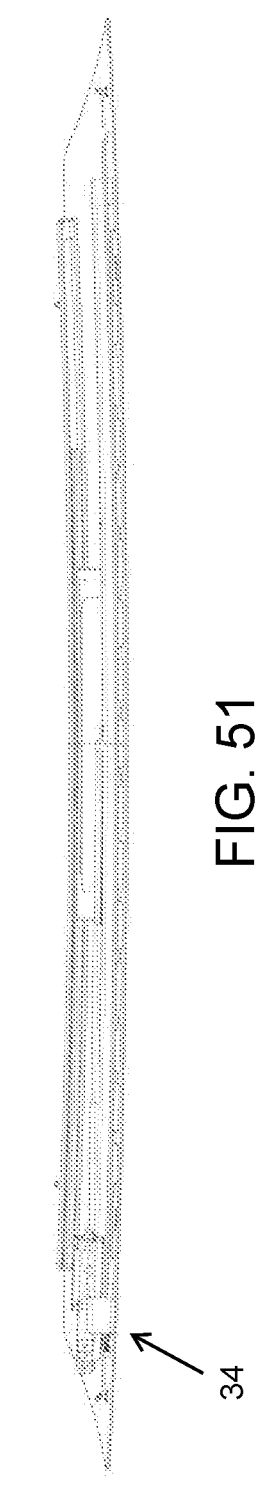
FIG. 50
FIG. 51
FIG. 52

SLIDER WINDOW ASSEMBLY WITH MOVABLE PANEL DRIVE SYSTEM

CROSS REFERENCE TO RELATED APPLICATIONS

The present application is a division of U.S. patent application Ser. No. 16/438,513, filed Jun. 12, 2019, which claims the filing benefits of U.S. provisional application Ser. No. 62/684,948, filed Jun. 14, 2018, which is hereby incorporated herein by reference in its entirety.

FIELD OF THE INVENTION

The present invention relates to a slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

SUMMARY OF THE INVENTION

The present invention provides a rear slider window assembly having a drive system that uses a single flexible drive element to open and close the window. The window assembly and drive system include structure that limits flexing or bending of the drive element when pulling or pushing the movable window.

According to an aspect of the present invention, the rear slider window assembly includes a frame portion having an upper rail and a lower rail, a fixed window panel (defining an opening) that is fixed relative to said frame portion, and a movable window panel that is movable along the upper rail and the lower rail. The movable window panel is movable between a closed position, where the movable window panel is disposed at the opening, and an opened position, where the movable window panel is disposed at least partially along the at least one fixed window panel. A drive system is operable to move the movable window panel between the opened and closed positions. The drive system comprises a single flexible drive element that, when the drive system is actuated to move the window panel in one direction, pulls the movable window panel along the lower rail, and when the drive system is actuated to move the window panel in the opposite direction, the drive element pushes the movable window panel along the lower rail. The lower rail of the frame portion comprises guide structure that limits flexing or bending of the drive element when the drive element pushes the movable window panel along the lower rail.

The flexible drive element may comprise a flexible cable or tape, and the guide structure may comprise one or more channels disposed along or formed along the lower rail or a telescoping support or the like. Thus, rotatably driving the drive motor of the drive system in one direction causes movement of the flexible drive element in one direction to open the window, and rotatably driving the drive motor of the drive system in the opposite direction causes movement of the flexible drive element in the opposite direction to close the window. The flexible drive element may be coiled or spooled when retracted, or may be routed along another side region of the lower rail (so that the entirety of the flexible drive element is disposed along the rail).

These and other objects, advantages, purposes and features of the present invention will become apparent upon review of the following specification in conjunction with the drawings.

BRIEF DESCRIPTION OF THE DRAWINGS

FIG. 2 is a rear elevation of the exterior of the window assembly, which has a helical cable drive system;

FIG. 3 is a bottom plan view of the window assembly of FIG. 2;

FIG. 4 is a side elevation of the window assembly of FIG. 2;

FIGS. 10 and 11 are additional views of the actuator and flexible helical cable of the drive system;

FIG. 13 is a rear elevation of the exterior of the window assembly, shown with a coilable cable drive system;

FIG. 14 is a side elevation of the window assembly of FIG. 13;

FIG. 15 is a front elevation of the interior of the window assembly of FIG. 13;

FIG. 16 is a bottom elevation of the window assembly of FIG. 13;

FIG. 17 is another side elevation of the window assembly of FIG. 13;

FIG. 26 is a front elevation of the interior of the window assembly of FIG. 25;

FIG. 27 is a bottom elevation of the window assembly of FIG. 25;

FIG. 28 is another side elevation of the window assembly of FIG. 25;

FIGS. 29 and 30 are views of the actuator and flexible tape of the drive system;

FIG. 31 is a sectional view taken along the line A-A in FIG. 26;

FIGS. 32 and 33 are additional views of the actuator and flexible tape of the drive system;

FIG. 34 is a perspective view of the drive system;

FIG. 38 is a front elevation of the interior of the window assembly of FIG. 35;

FIG. 39 is a bottom elevation of the window assembly of FIG. 38;

FIG. 40 is another side elevation of the window assembly of FIG. 35;

FIGS. 44-47 are views of the actuator and flexible notched tape of the drive system;

FIG. 48 is a perspective view of the drive system;

FIG. 50 is a front elevation of the interior of the window assembly of FIG. 49;

FIG. 51 is a bottom elevation of the window assembly of FIG. 50;

FIG. 52 is another side elevation of the window assembly of FIG. 50;

DESCRIPTION OF THE PREFERRED EMBODIMENTS

Figure 1:
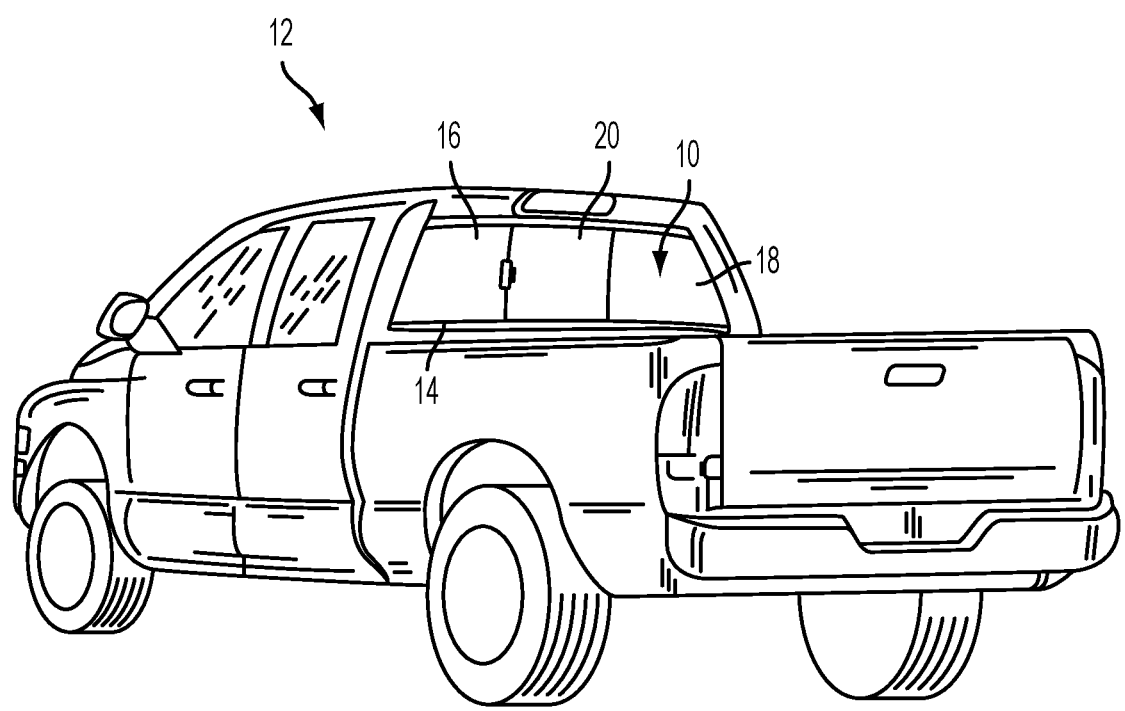
FIG. 1 is a rear perspective view of a pickup truck having a rear slider window assembly in accordance with the present invention.
Figure 5:
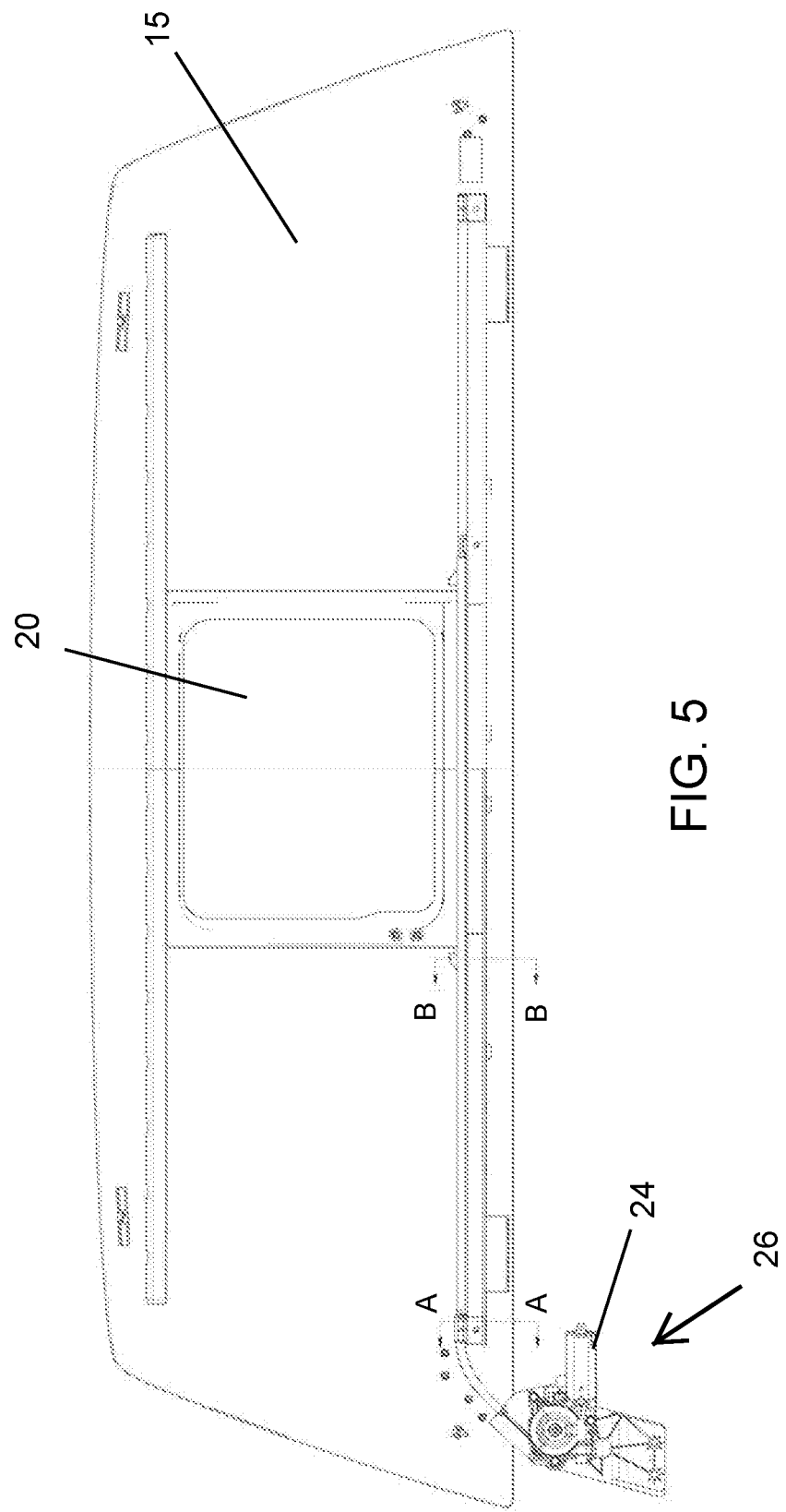
FIG. 5 is a front elevation of the interior of the window assembly of FIG. 2.

Referring now to the drawings and the illustrative embodiments depicted therein, a rear slider window assembly 10 of a vehicle 12 (such as a pickup truck or the like) includes a window frame 14, a fixed window panel 15 having an aperture that separates side window portions 16, 18 and a movable window panel 20 that is movable relative to frame 14 and fixed window panel between an opened position and a closed position (FIGS. 1-3). The movable window panel 20 is movable along the frame 14 (such as along upper and lower rails or channels of the frame) relative to the fixed window panel(s) via a drive system that pulls and/or pushes the movable panel in either direction to open and close the rear window, such as responsive to a user input or switch in the vehicle cabin.

The drive system comprises a single flexible drive element, such as a flexible cable or tape or extending/retracting element that is disposed along the channel only on one side of the opening. In other words, the drive system does not have two cables that function to pull at the movable window panel in either direction to open or close the window. Instead, the drive system pulls the movable window in one direction and pushes it in the other direction to open and close the window. The window assembly and drive system include guide structure that limits or precludes flexing or bending of the flexible drive element as it moves along the lower rail of the window, particularly when pushing the movable window panel along the lower rail. The drive system comprises a drive motor 24 of a flexible helical cable drive system 26 (FIGS. 2-12) or a flexible cable drive system 28 (FIGS. 13-24) or a flexible tape drive system 30 (FIGS. 25-34) or a flexible notched tape drive system 32 (FIGS. 35-48) or a telescoping cable drive system 34 (FIGS. 49-58), as discussed below. The drive systems and window panels and channels/frames may be similar construction across several or all of the window assemblies, such that detailed discussions of common or similar aspects may not be repeated throughout the disclosure.

The drive system is mounted at the end of the lower channel or frame or rail 14*a*, which comprises a plastic U-shaped channel portion 14*b* (adhered to the interior surface of the fixed window panel) and an aluminum extruded channel 14*c*, along which the movable window panel 20 and its carrier 20*a* slidably move when opened and closed. The end of the lower rail 14*a* at which the drive system is attached or mounted includes an end cap 14*d*, which may be formed to accommodate or guide or support the cable or tape or tube of the drive system, as discussed below.

Optionally, and desirably, the drive motor or actuator or housing of the drive system may be pivotally mounted at the lower corner of the fixed window panel, so that the drive motor and cable or tape may be flipped onto the interior surface of the window for packaging and transport of the window assembly. When the window assembly is to be installed in the vehicle, the motor is flipped down and affixed relative to the window (via attachment at a window mounting bracket and/or at a vehicle mounting bracket) in its use position (shown in the drawings). Such a pivotable attachment reduces the size of the window assembly during transport.

Figure 6:
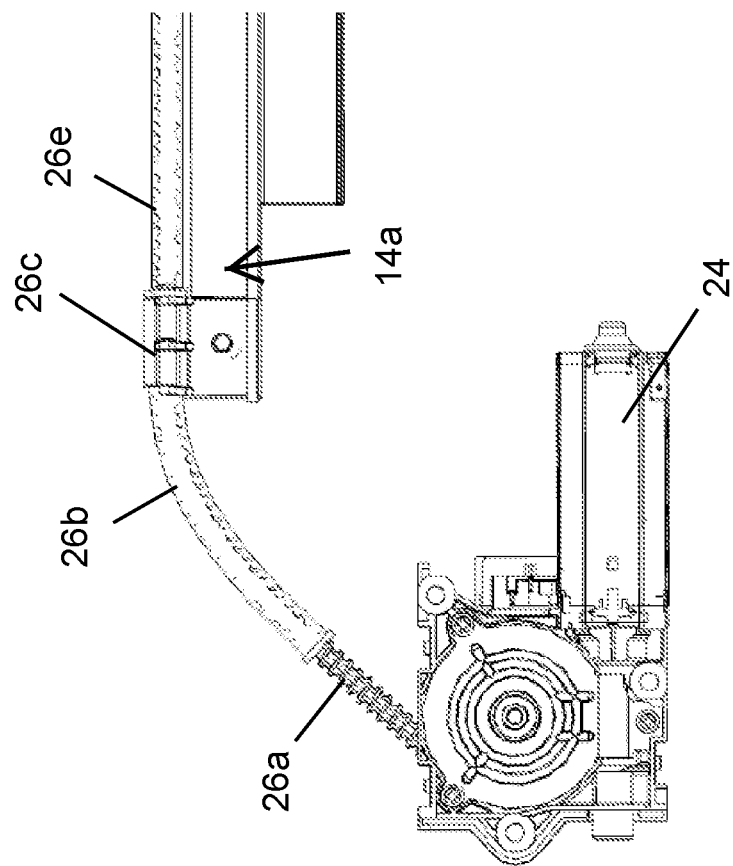
FIGS. 6 and 7 are views of the actuator and flexible helical cable of the drive system.
Figure 7:
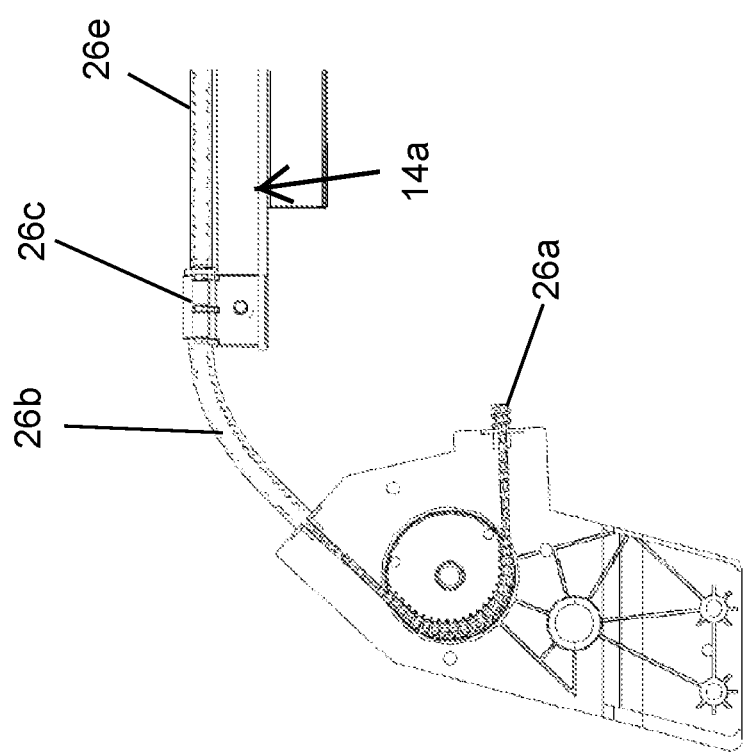
Figure 9:
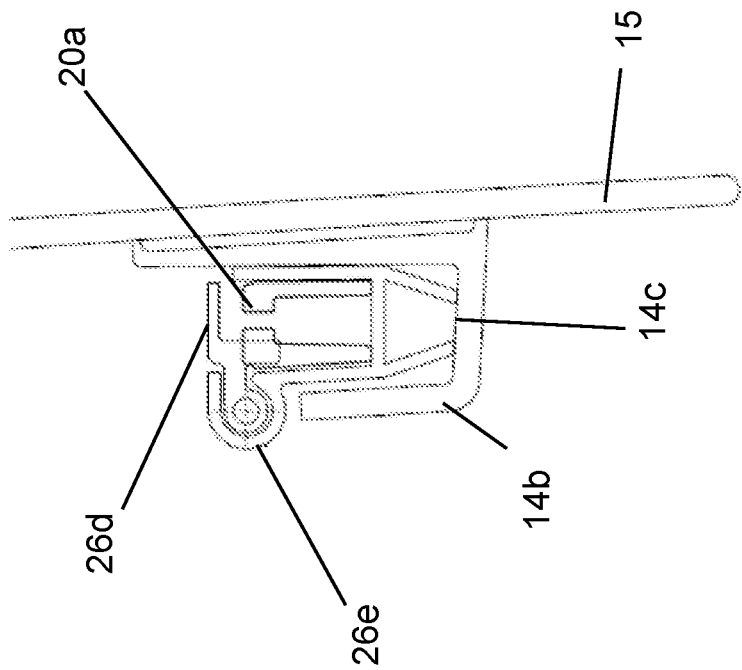
FIG. 9 is a sectional view taken along the line B-B in FIG. 5.
Figure 8:
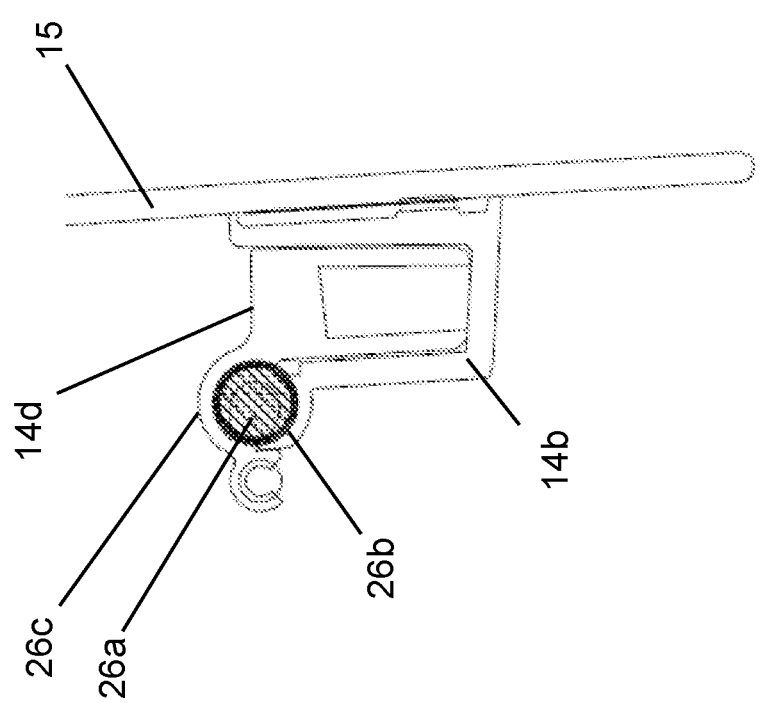
FIG. 8 is a sectional view taken along the line A-A in FIG. 5.
Figure 12:
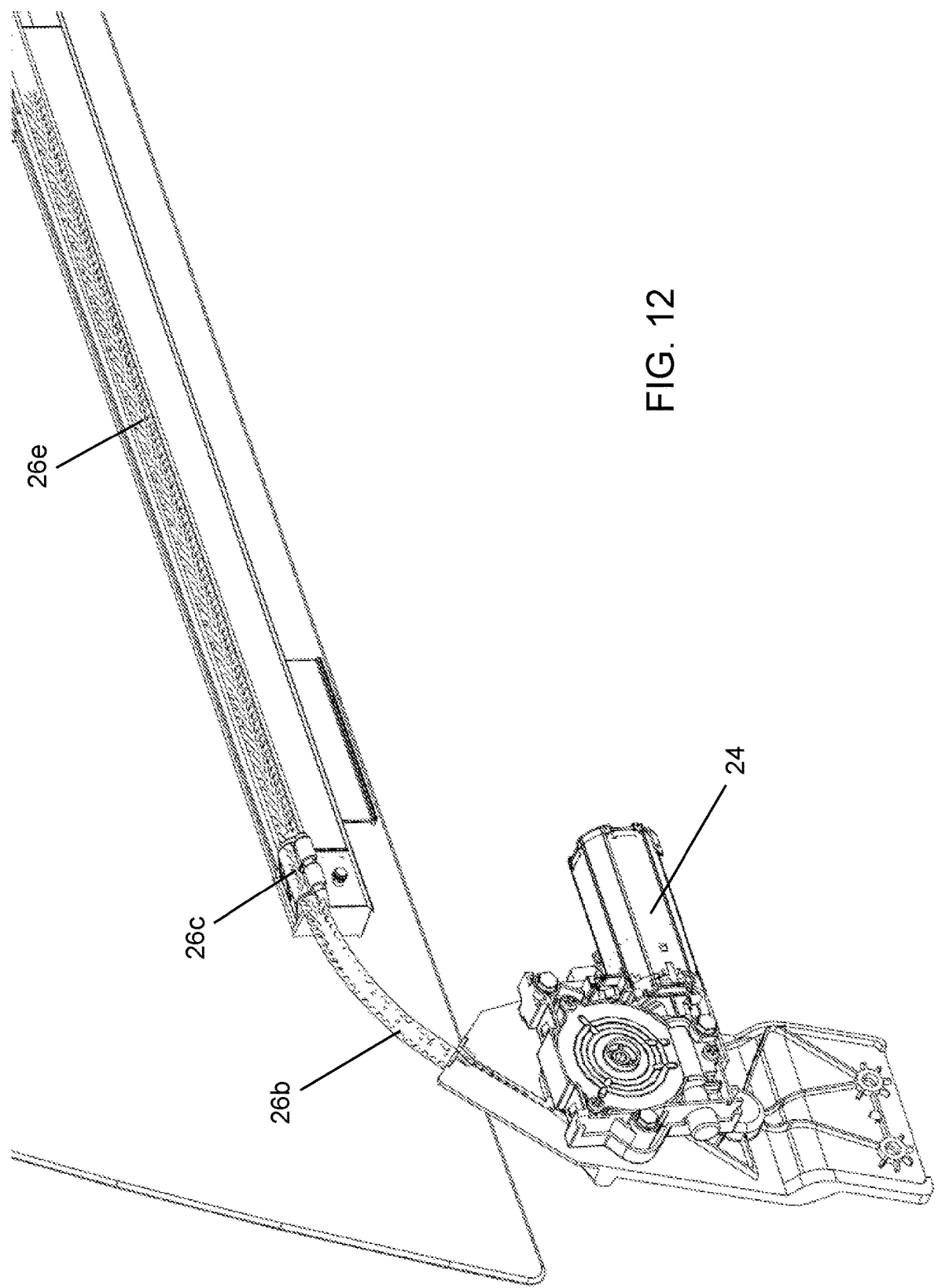
FIG. 12 is a perspective view of the drive system.
Figure 18:
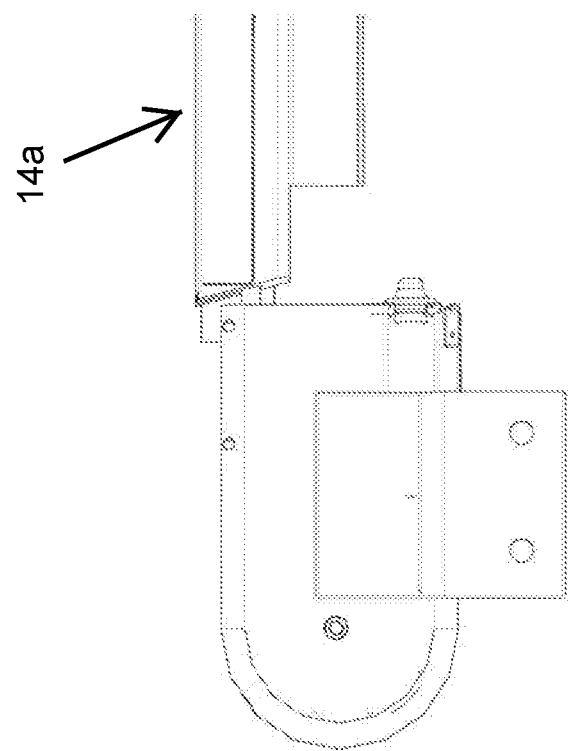
FIGS. 18 and 19 are views of the actuator and flexible reel cable of the drive system.

Referring to FIGS. 2-12, the drive motor 24 of drive system 26 rotatably drives a gear that engages the flexible drive element or helical cable 26*a* to move the cable in either direction along the lower rail or channel 14*a* to move the movable window panel 20 relative to the frame 14 and fixed panel 15. As shown in FIGS. 6 and 7, the helical cable 26*a* is routed from the drive motor 24 through a rigid cable tubing 26*b* and into a receiving portion 26*c* of the end cap attachment 14*d*. The end of the cable 26*a* attaches at a carrier attachment 26*d* of the carrier 20*a* of the movable window panel.

The cable 26*a* is routed along an extruded channel or passageway 26*e* of the rail 14*a* such that the cable 26*a* does not bend or flex along the rail 14*a* when the drive system is moving the movable window panel away from the drive motor to close the window. Thus, during operation of the drive system 26, the drive motor 24 rotates the gear that engages the cable 26*a* to move the cable in either direction through the rigid tubing 26*b* and rail or channel 14*a*, which moves the carrier and movable window panel 20 along the frame 14.

Figure 19:
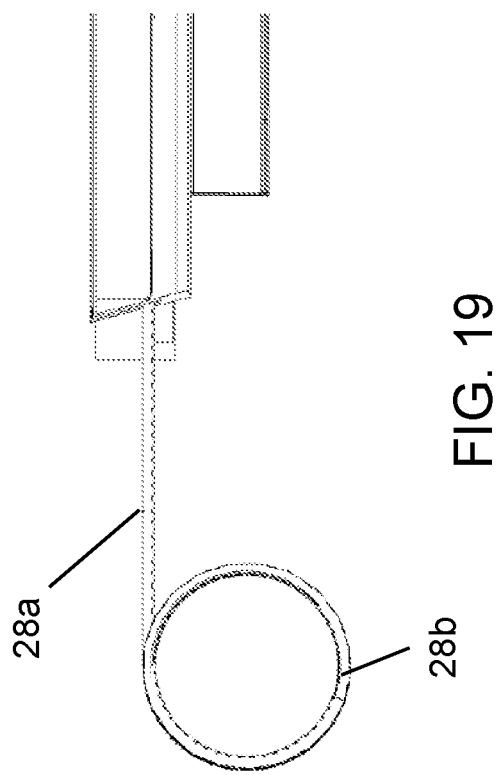
Figure 21:
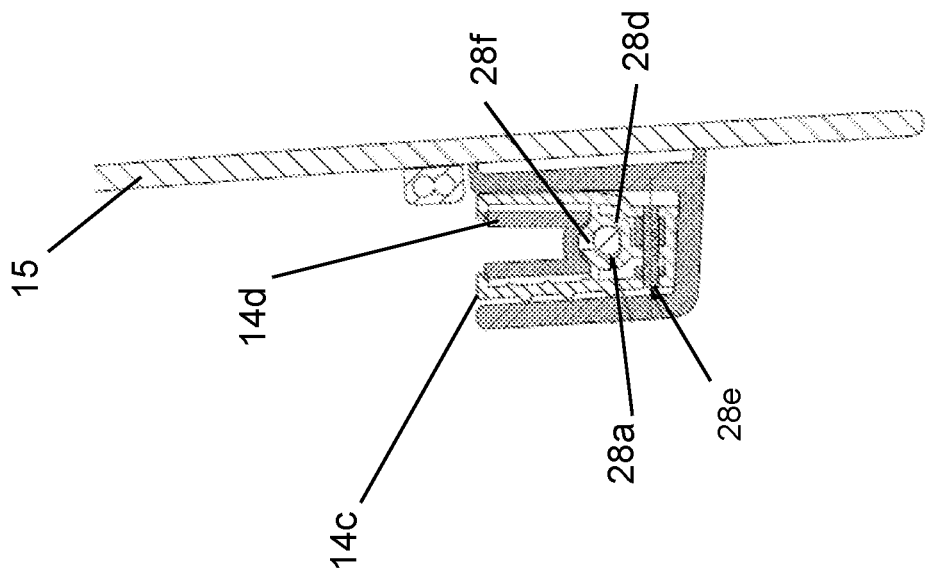
FIG. 21 is a sectional view taken along the line B-B in FIG. 15.
Figure 20:
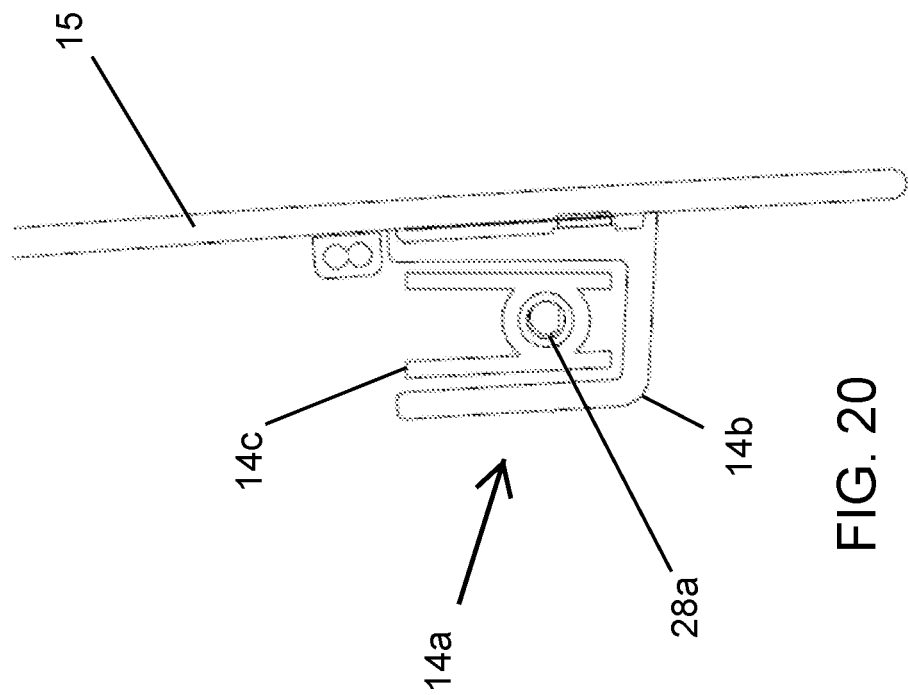
FIG. 20 is a sectional view taken along the line A-A in FIG. 15.
Figure 22:
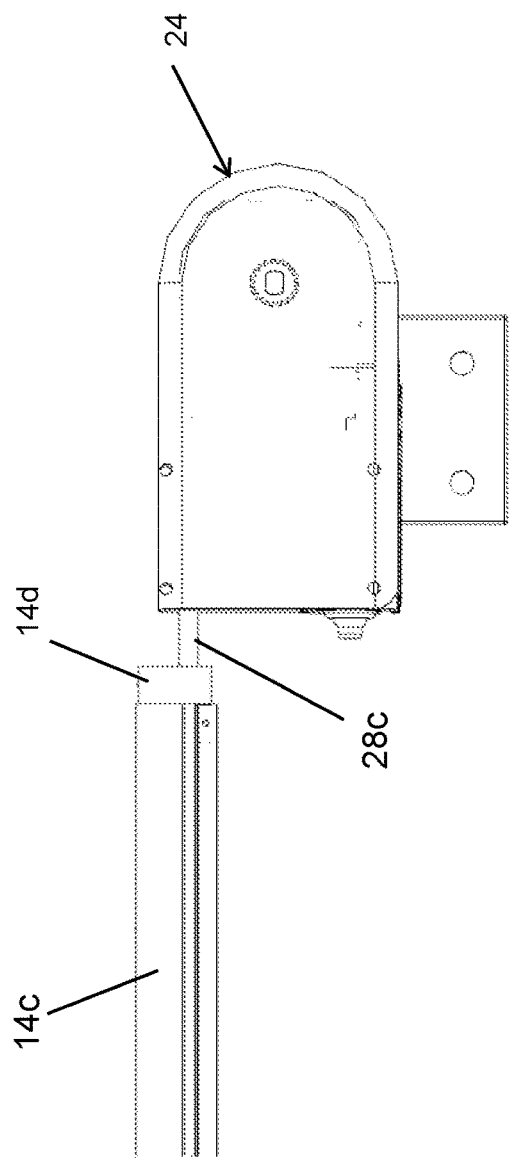
FIGS. 22 and 23 are additional views of the actuator and flexible cable of the drive system.
Figure 23:
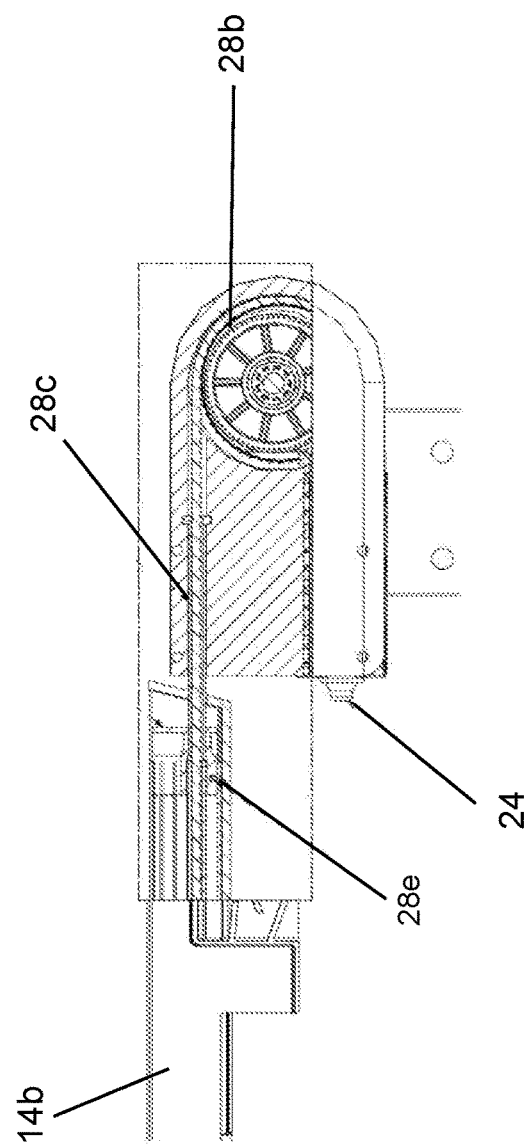
Figure 24:
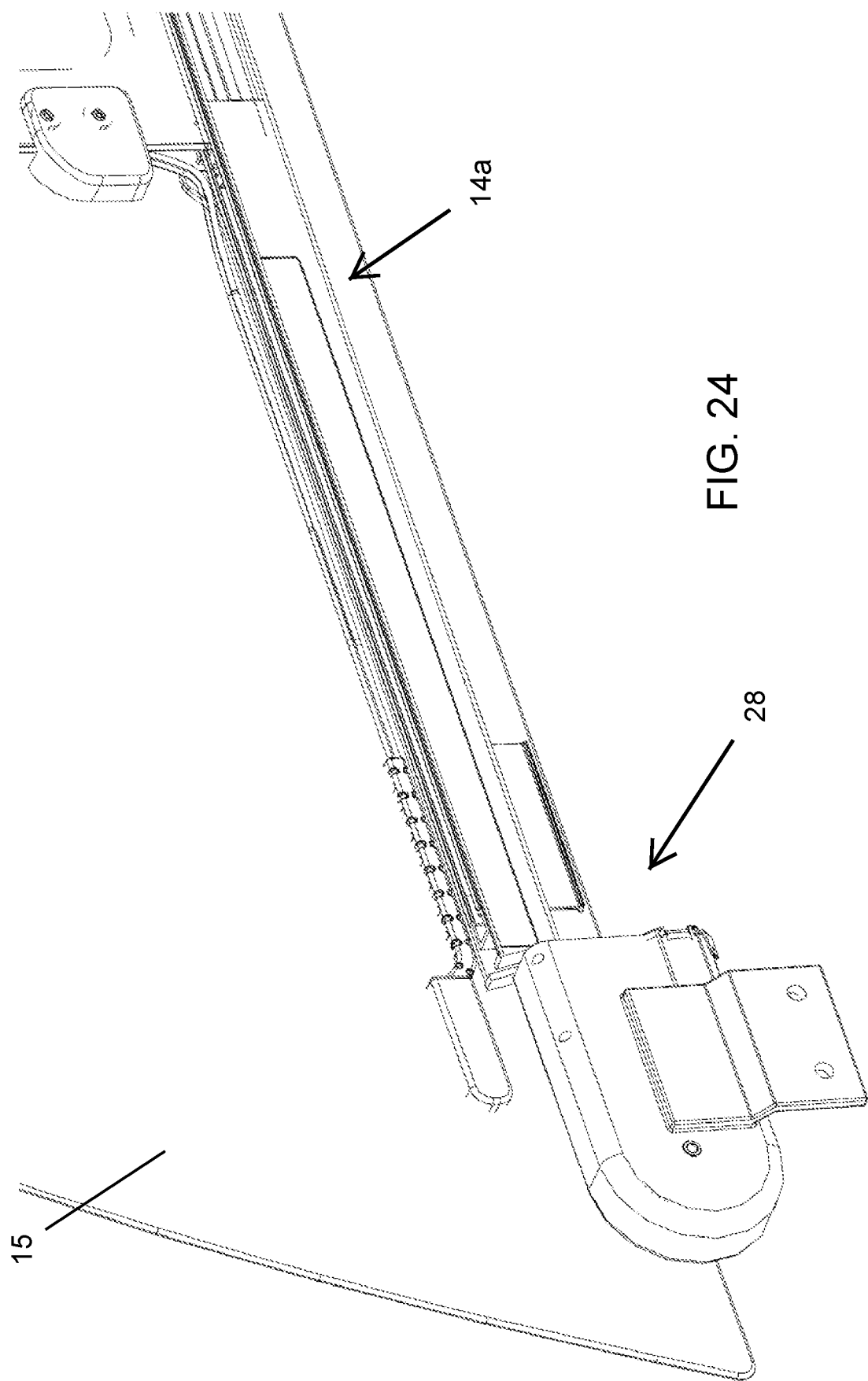
FIG. 24 is a perspective view of the drive system.
Figure 25:
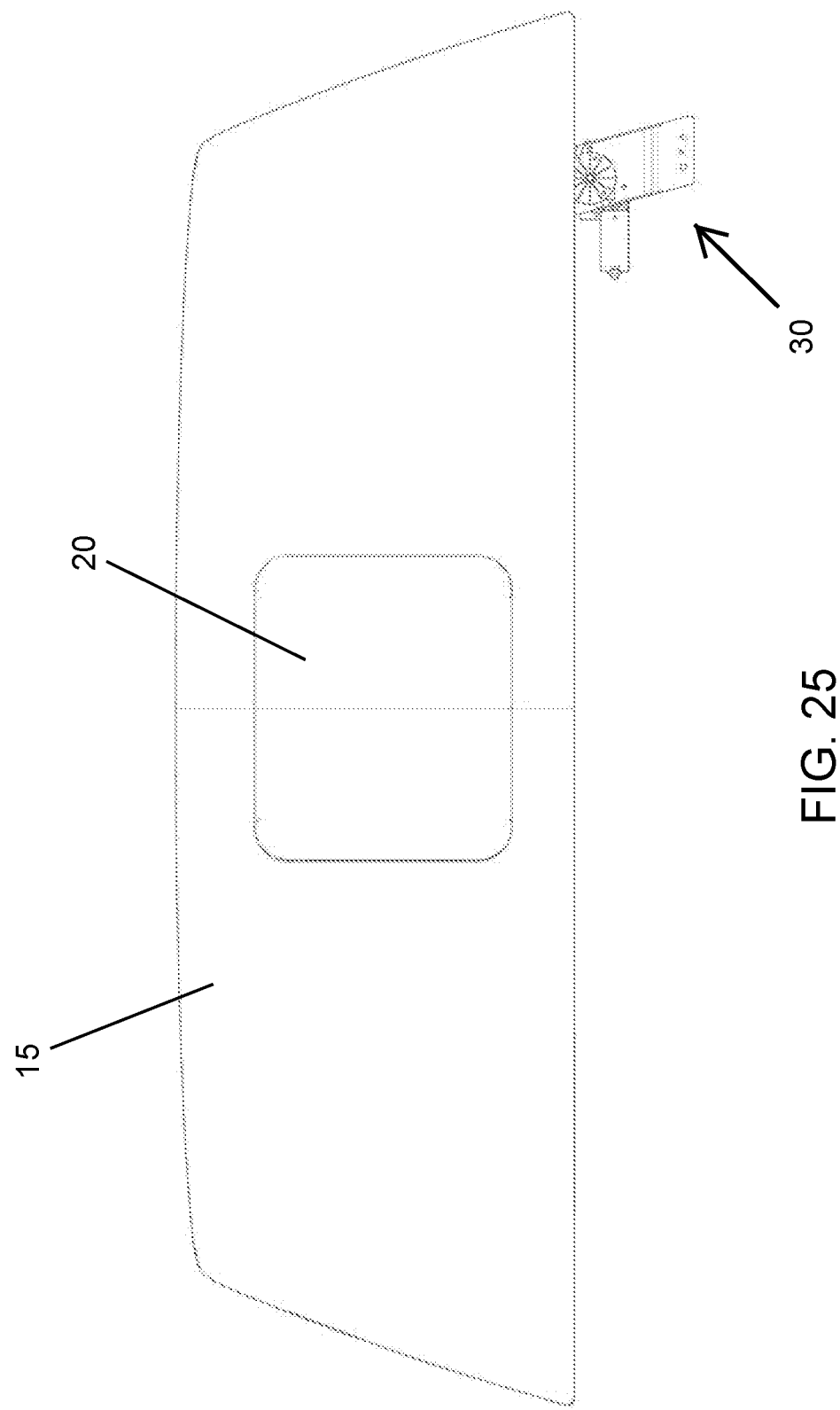
FIG. 25 is a rear elevation of the exterior of the window assembly, shown with a flexible tape drive system.
Figures 35, 36, 37:
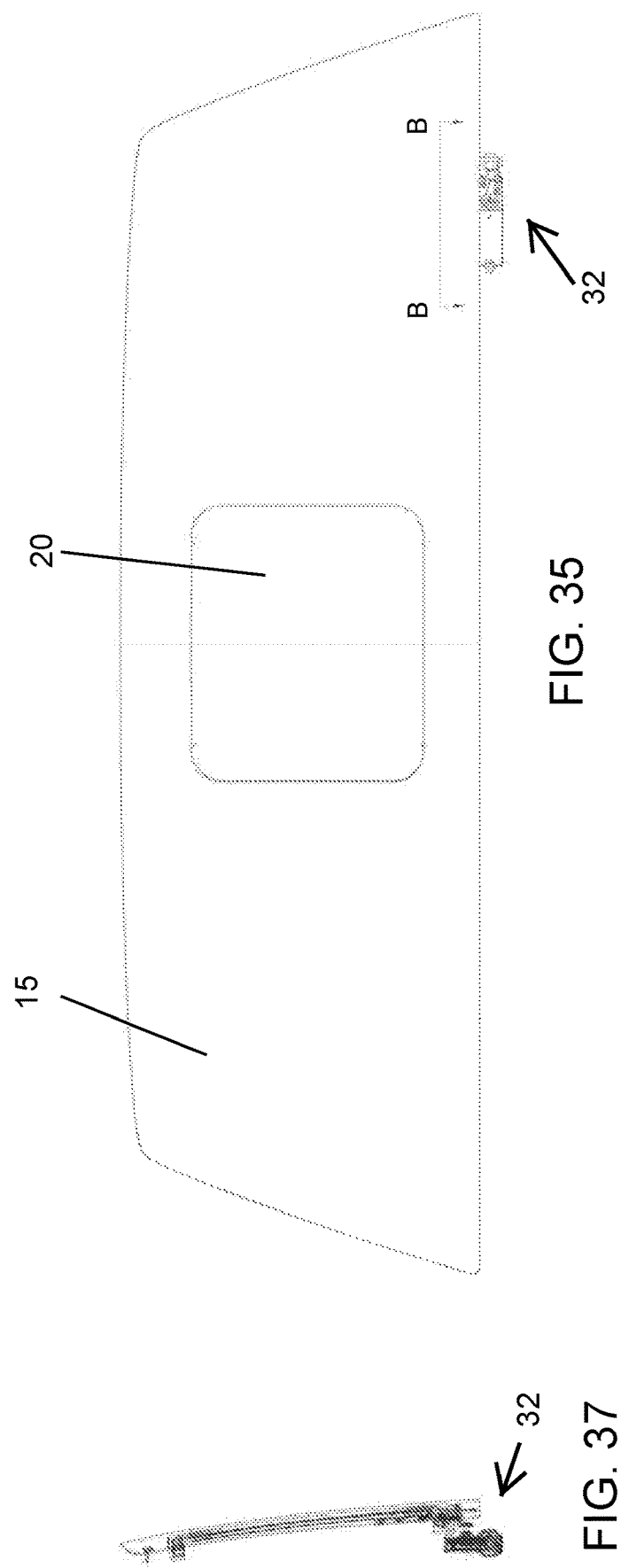
FIG. 35 is a rear elevation of the exterior of the window assembly, shown with a flexible notched tape drive system.
FIG. 36 is a bottom elevation of the window assembly of FIG. 35.
FIG. 37 is a side elevation of the window assembly of FIG. 35.

Referring now to FIGS. 13-24, the drive motor 24 of the drive system 28 rotatably drives a reel that coils and uncoils a flexible cable 28*a*. As shown in FIG. 19, the cable 28*a* includes notches along a side thereof for engaging teeth of the motor drive or reel 28*b* to impart winding or unwinding of the cable 28*a* from the reel. As shown in FIG. 23, the cable is routed through a guide tube 28*c* that connects between the reel and motor and the end of the rail or channel 14*a*. The cable is further routed into a passageway of the end cap of the rail (FIG. 23) and along a passageway 28*d* formed with the rail 14*a* (such as extruded with the aluminum rail or channel, as can be seen in FIG. 21), with the passageway along the rail receiving the cable therein and having side walls or structure that limits or precludes any flexing of the cable so that the cable can function to push the movable panel along the frame and fixed window panel.

At the end of the cable is a connector or pin or element that is configured to connect the cable to the carrier of the movable window panel. In the illustrated embodiment, the cable is connected to the connector/end of the carrier via a pin 28e (FIG. 15) that extends upward from the end of the cable and through a slot 28f along the top of the passageway (see FIG. 21). When the cable is wound and unwound at the reel 28b by the drive motor, the pin moves with the cable end and moves along the slot formed along the top of the passageway. The rail and extruded cable enclosure thus function to guide the cable and to limit or preclude flexing of the cable, which is flexible but sufficiently strong so as to be able to push the carrier and movable panel when the cable is unwound from the reel.

Referring now to FIGS. 25-34, the drive motor 24 of the drive system 30 rotatably drives a reel that coils and uncoils a flexible tape or strip 30a (such as a flattened metallic strip that is flexible in one direction and not as flexible in another direction orthogonal to the one direction) via rotation of a reel 30b (FIG. 29). As shown in FIGS. 32 and 33, the reel 30b has a toothed outer circumferential surface for engaging a drive gear of the motor, such that rotation of the drive gear rotates the reel about an axis normal to the axis of rotation of the drive gear.

As shown in FIG. 31, the tape 30a comprises a generally U-shaped tape that allows for limited flexing of the tape. The tape 30a is received and moves along a correspondingly formed or similarly formed passageway 30c of the rail or channel 14a, where the passageway 30c limits flexing of the tape so that the tape is capable of pushing the carrier and movable panel along the frame and fixed window panel when the drive motor is actuated to uncoil the flexible tape from the reel. As can be seen with reference to FIGS. 32 and 33, the tape 30a is received through a passageway or guide portion 30d of the channel 14b (FIG. 32) and then is received in the passageway 30c of the extruded channel 14c (FIG. 33). The end of the tape 30a may connect to the carrier of the movable window panel via any suitable connection, such as a pin or connector 30e that extends upward through a slot 30f at the upper region of the passageway 30c (such as in a similar manner as the pin 28e moves along the slot 28f for drive system 28).

Referring now to FIGS. 35-48, the drive motor 24 of the drive system 32 rotatably drives a drive gear 32b that rotates a toothed wheel or gear 32c that engages and moves a flexible notched tape 32a. As shown in FIGS. 43 and 44, the toothed wheel or gear 32c is disposed within the lower rail and is rotatable about a vertical axis and engages notches of the flexible notched tape 32a, such that rotation of the drive gear and toothed wheel moves the tape 32a around the toothed wheel in either direction. The motor 24 may rotatably drive the drive gear 32b via an output drive gear that rotates about a horizontal axis, such as can be seen with reference to FIGS. 46 and 47. The drive gearbox and gear 32b and toothed wheel 32c and the notched tape are disposed within the rail or within the profile of the rail and thus may be packaged within the rail for a reduced profile drive system.

Figure 42:
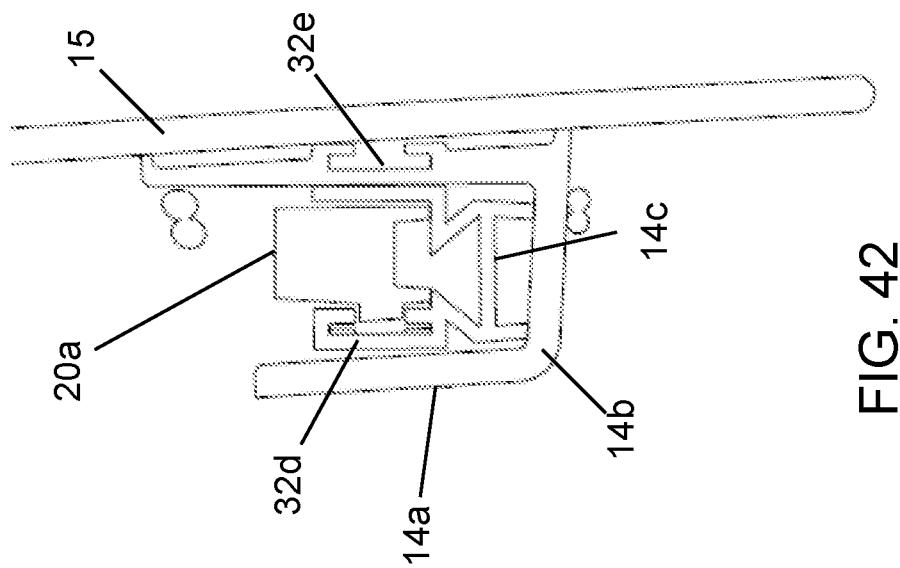
FIG. 42 is a sectional view taken along the line C-C in FIG. 38.
Figure 41:
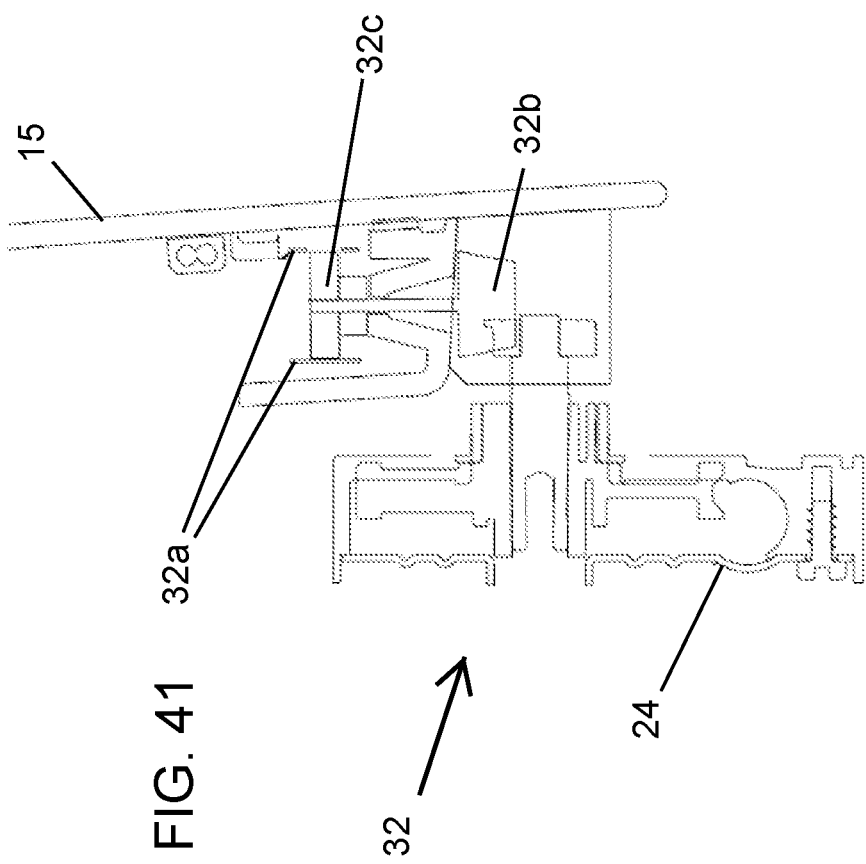
FIG. 41 is a sectional view taken along the line A-A in FIG. 38.
Figure 43:
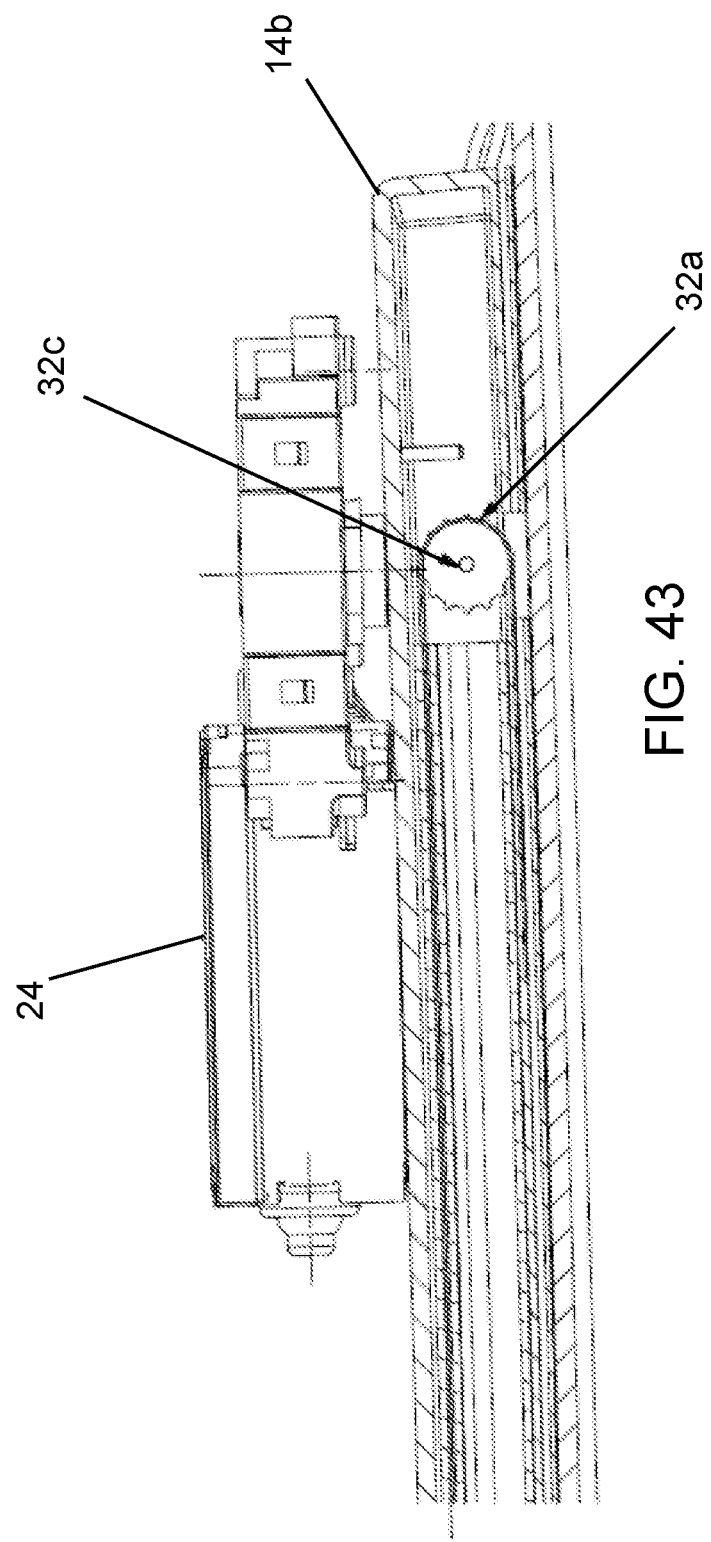
FIG. 43 is a sectional view taken along the line B-B in FIG. 35.
Figure 47:
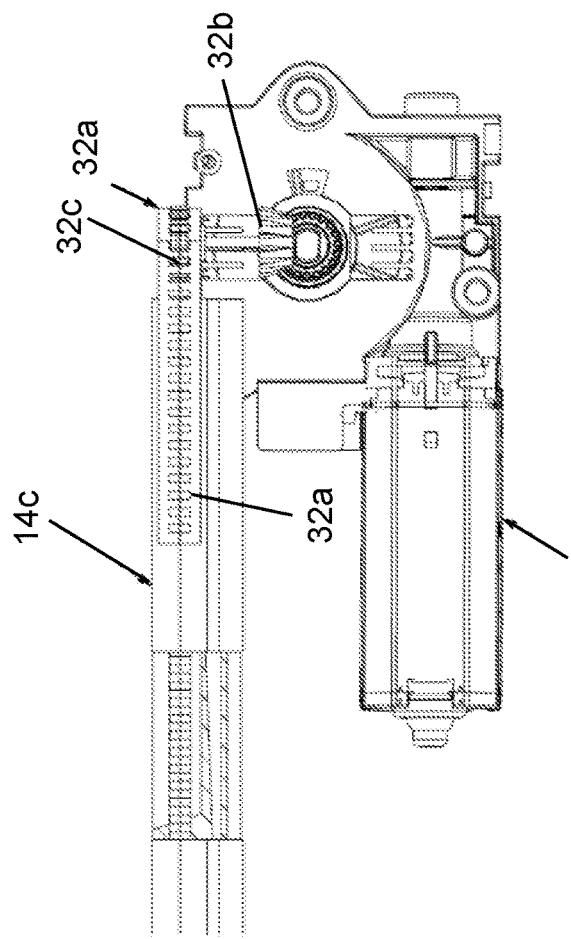
Figure 46:
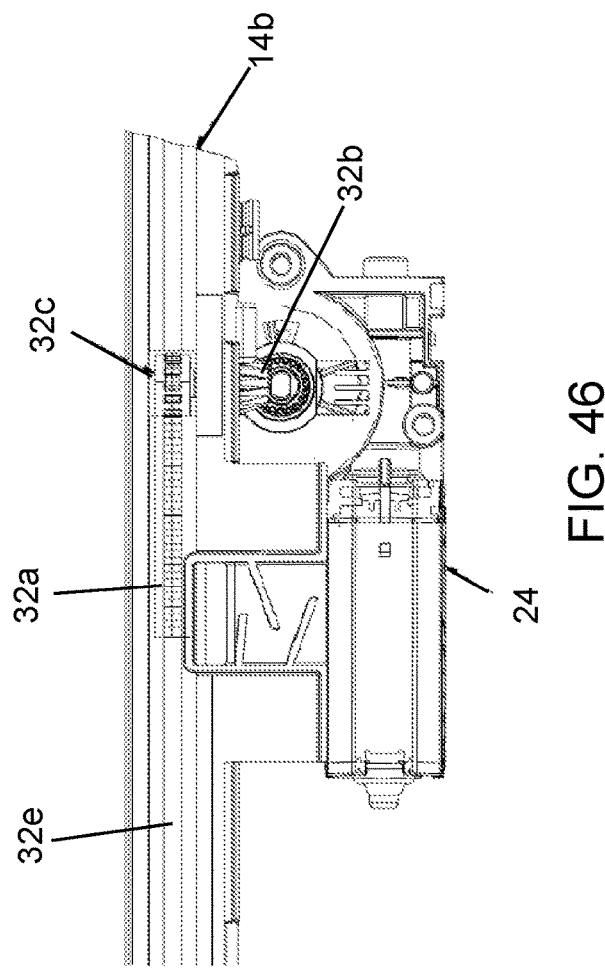
Figure 49:
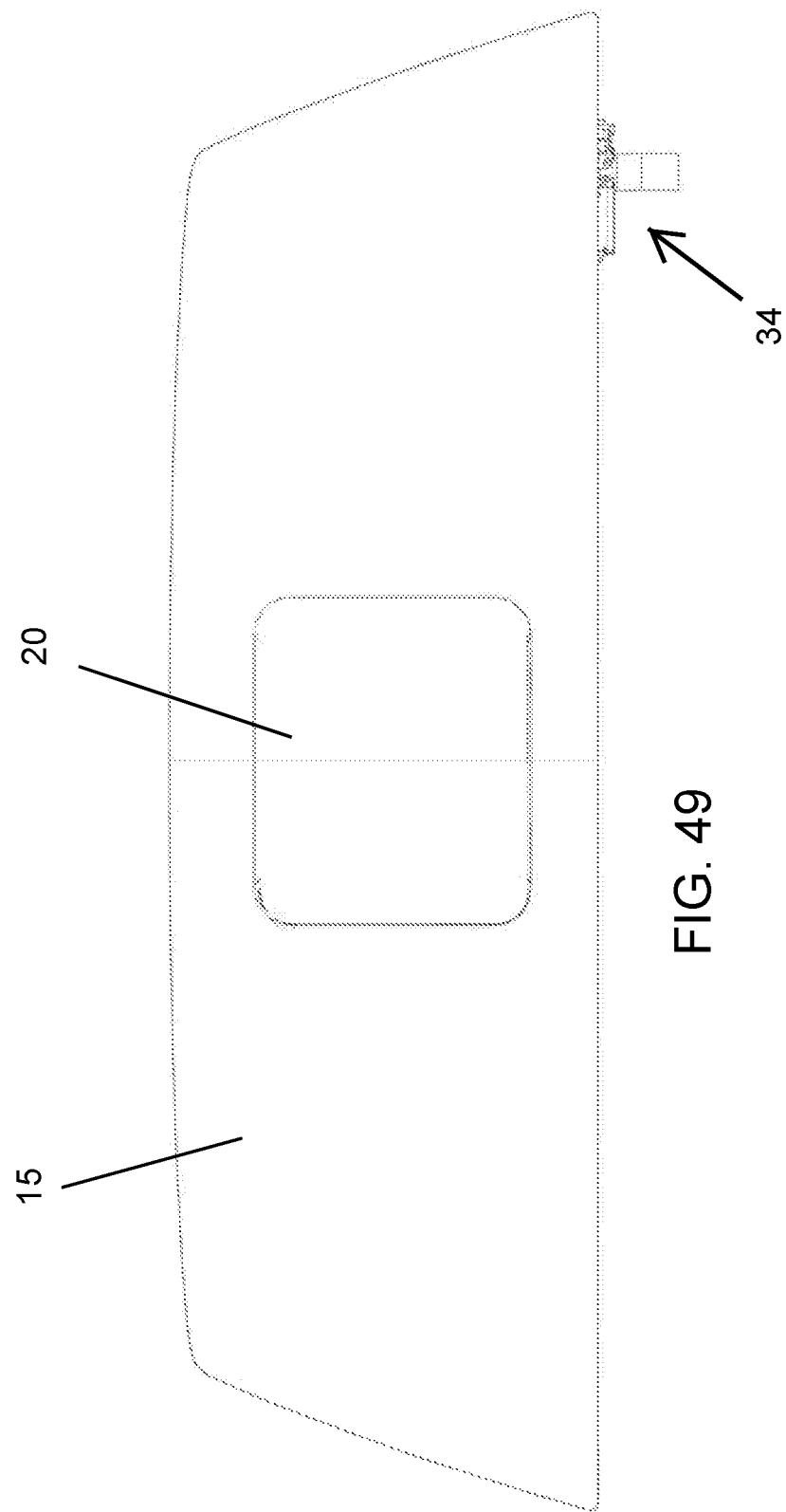
FIG. 49 is a rear elevation of the exterior of the window assembly, shown with a telescoping cable drive system.
Figure 53:
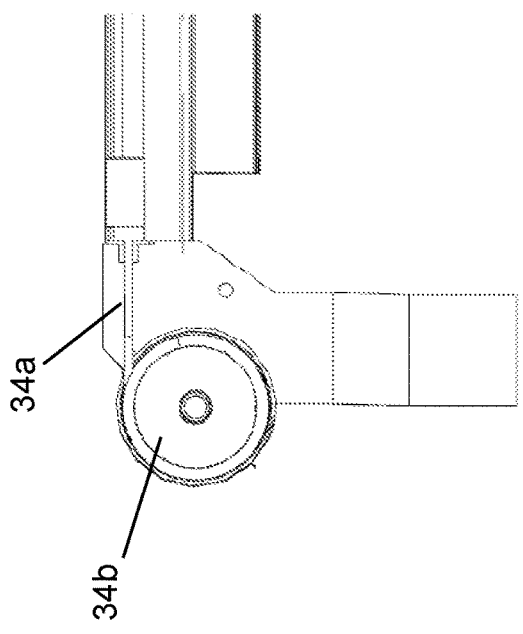
FIGS. 53 and 54 are views of the actuator and telescoping cable of the drive system.
Figure 54:
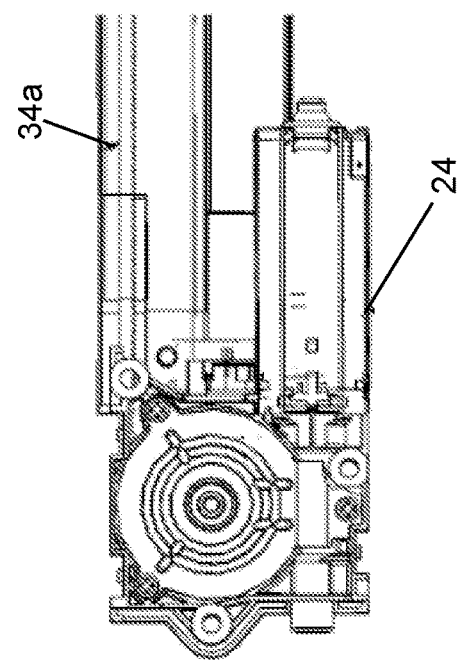

The notched tape 32a is routed along channels 32d, 32e along opposite sides of the rail or channel 14a (FIG. 42). In the illustrated embodiment, the channel 32d is formed or extruded along the aluminum rail 14c that is received in the molded lower rail or channel 14b, while the channel 32e is formed along the surface of the lower rail or channel 14b that faces toward and is bonded to the interior surface of the fixed window panel 15. One end of the notched tape 32a (such as the end of the portion of the tape that is in channel 32d) is connected to or attached to the carrier 32f of the movable window panel (such as via a pin or tooth or pins or teeth being received in notches at the end of the tape), such that movement of the tape (via rotation of the toothed wheel 32c) moves the end of the tape and the movable window panel along the frame and fixed window panel. The other end or portion of the tape (see FIGS. 46 and 47) is disposed in and moves along the channel 32e of the lower rail or channel 14b, which functions to guide and support the tape during operation of the drive system 32.

The channels 32d, 32e function to allow for movement of the tape in either direction but limit or preclude flexing of the tape so that the tape can function to push the carrier and movable window panel along the frame. For example, when the toothed wheel is rotated in the counter-clockwise direction in FIG. 43, the end of the tape attached to the carrier moves along the channel 32d and pulls at the carrier and movable window to open the window, with the other end of the tape moving along channel 32e away from the toothed wheel. When the toothed wheel is rotated in the clockwise direction in FIG. 43, the end of the tape attached to the carrier moves along the channel 32d and pushes at the carrier and movable window to close the window, with the other end of the tape moving along the channel 32e toward the toothed wheel.

Referring now to FIGS. 49-58, the drive motor 24 of drive system 34 winds and unwinds a flexible cable 34a about a spool or reel 34b. The cable 34a is received in or disposed in a telescoping support tube or enclosure or construction 34c that telescopingly extends when the cable is uncoiled or unwound and telescopingly retracts when the cable is coiled or wound. The cable is a flexible cable to allow for coiling at the reel or spool, yet is sufficiently resistant to flexing (when restrained by the tube) as it is extended and pushes the innermost section of the telescoping support tube outward. In the illustrated embodiment, the telescoping tube support 34c comprises three sections (a base section that receives a middle or intermediate section that receives an innermost section).

The telescoping support tube 34c is disposed along the channel or rail 14a and, when extended, the end of the innermost section of the support tube reaches to around the mid-point of the window assembly (see FIGS. 50 and 51). By connecting the cable or end of the innermost section of the telescoping tube 34c to the middle region of the carrier of the movable window panel, the movable window panel can be fully opened, whereby the middle of the movable window panel and the end of the innermost tube section approaches and is at or near the end of the base section of the tube. Optionally, if the tube were to connect at the end or side of the movable window panel, the base section may be smaller in length (and the tube may comprise four or five sections) to provide clearance at the base end between the carrier and end of the rail for the telescoping tube (when it is retracted).

Figure 55:
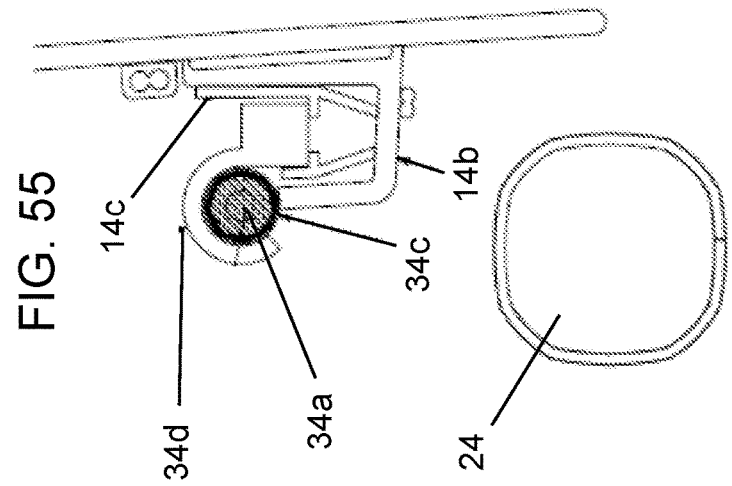
FIG. 55 is a sectional view taken along the line A-A in FIG. 50.
Figure 56:
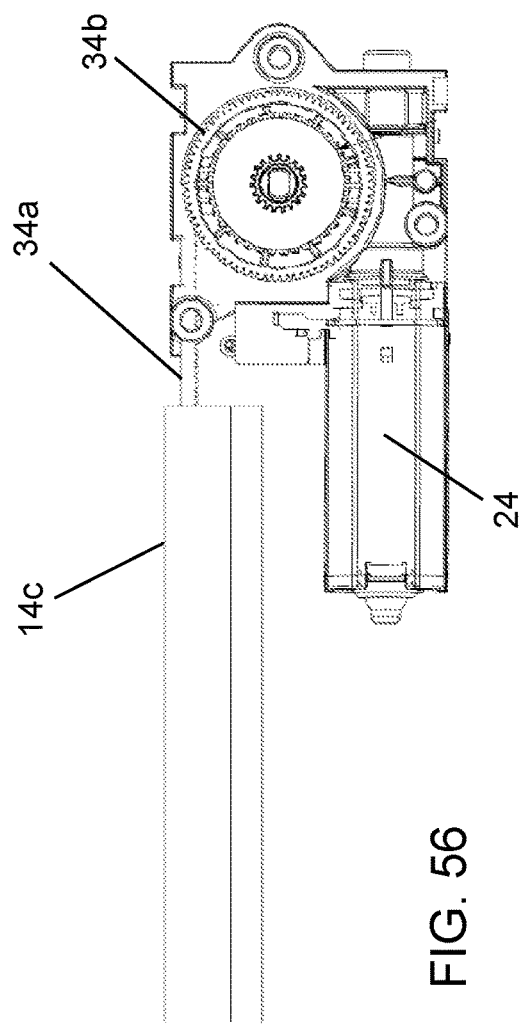
FIGS. 56 and 57 are additional views of the actuator and telescoping cable of the drive system.
Figure 57:
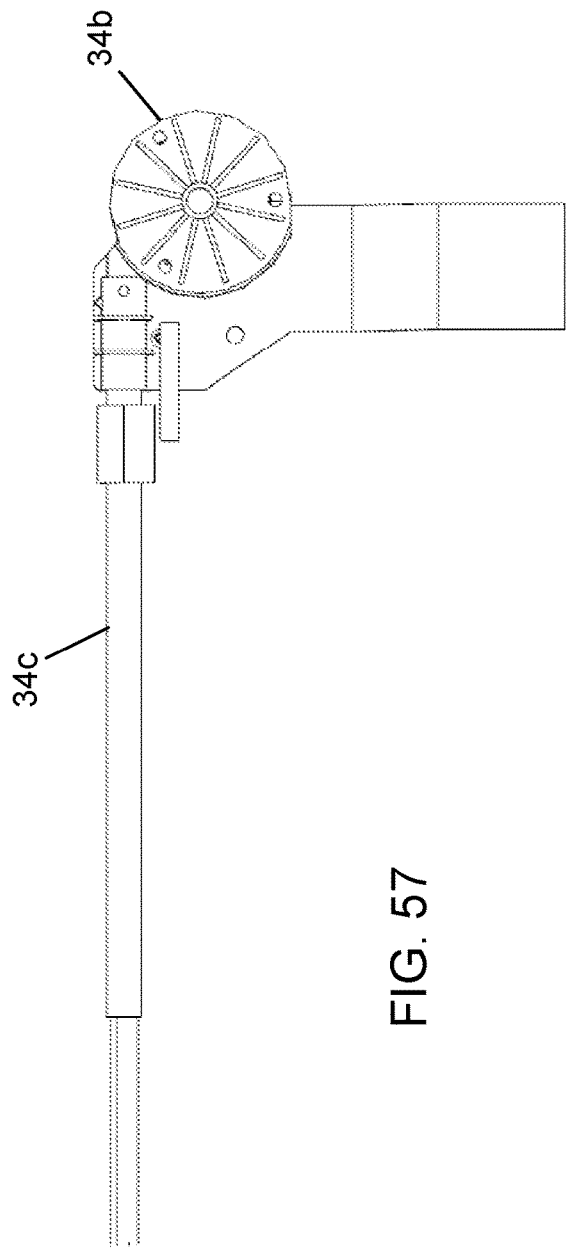
Figure 58:
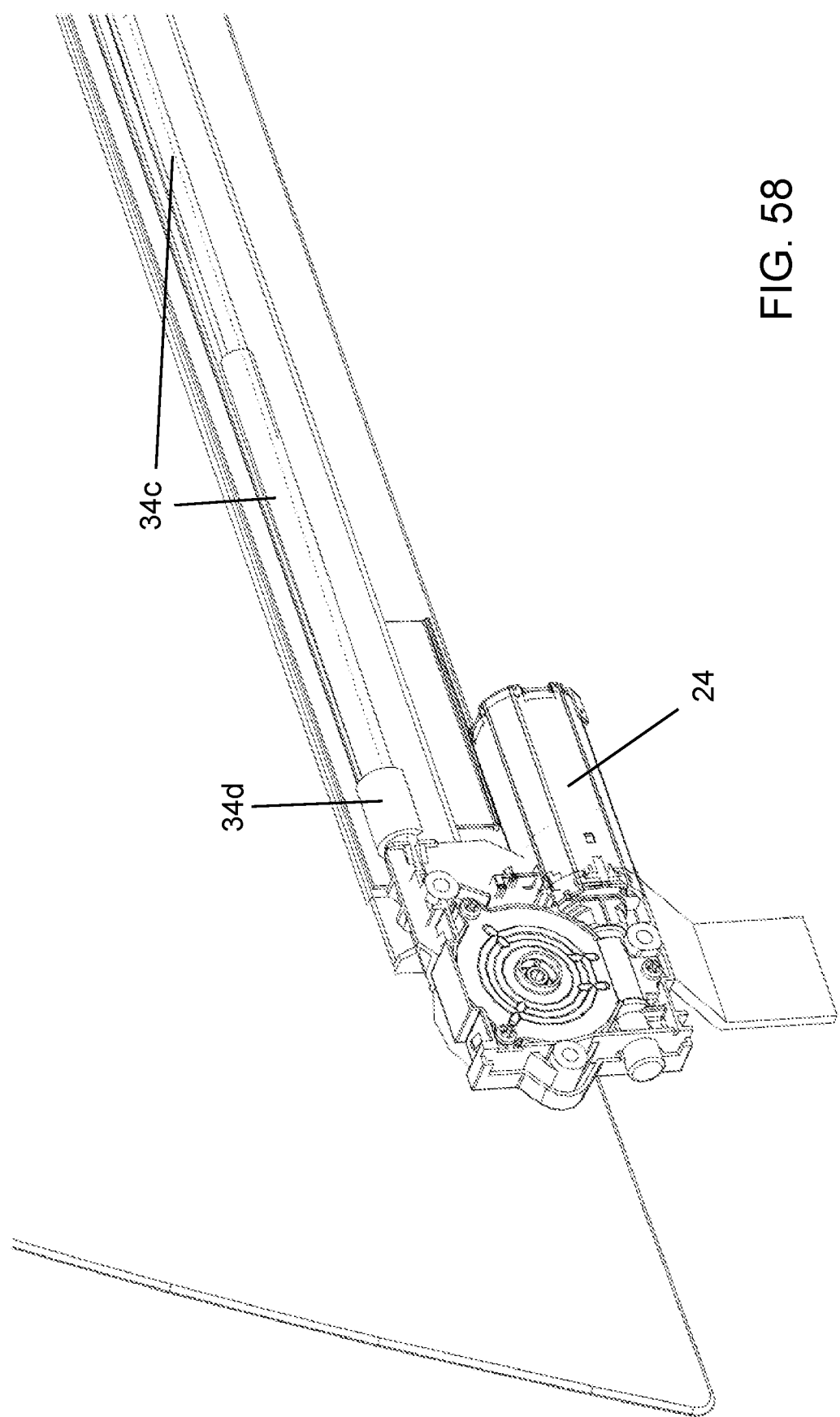
FIG. 58 is a perspective view of the drive system.

As shown in FIG. 55, the telescoping tube is received in or at an end cap attachment 34d, which guides and supports at least the base of the tube along the rail or channel 14a. The base portion of the tube may be further supported via formed (extruded or molded) receiving portions along the rail or channel, and additional supports may be formed along the rail or channel to guide and/or support the extended portions of the telescoping tube when the tube is at least partially extended.

Thus, the drive systems of the present invention provide for opening and closing the rear slider window assembly via a single flexible drive element or cable or tape or strip or the like that pulls the movable window panel in one direction (such as to open the window) and pushes the movable window panel in the other direction (such as to close the window). The drive systems include guides or structure that guide and support the flexible cable/tape to limit flexing or bending of the flexible cable/tape along the lower rail, particularly when the drive system is extending or uncoiling the flexible cable/tape to push the movable window panel along the frame.

The drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293; 8,151,519 and/or 8,938,914, and/or U.S. Publication Nos. US-2017-0356231; US-2004-0020131 and/or US-2008-0127563, which are all hereby incorporated herein by reference in their entireties.

In the illustrated embodiments, the window assembly comprises a hole-in-glass window configuration, where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening therebetween. The fixed window panels may comprise two separate spaced apart fixed window panels that define the opening therebetween (and with upper and lower appliqués or trim or filler panels or elements disposed at the upper and lower regions of the opening and between the fixed window panels, and thus with the lighting device disposed behind the upper appliqué or the like).

The benefits of embodiments of the present invention may also be realized in sliding window constructions where an aperture is created in a fixed window panel and where a movable window panel can be made to open or close the aperture. Slider windows of this type are disclosed such as in U.S. Pat. No. 8,915,018 and/or 8,881,458, and/or U.S. Publication No. US-2003-0213179 and/or RE41502, which are hereby incorporated herein by reference in their entireties. The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2006-0107600; US-2008-0127563; US-2004-0020131 and/or US-2003-0213179, and/or International Publication No. WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular slider window assembly, said vehicular slider window assembly comprising:
   a frame portion having an upper rail and a lower rail;
   a fixed window panel that is fixed relative to said frame portion, said fixed window panel at least in part defining an opening;
   a movable window panel that is movable along said upper rail and said lower rail, wherein said movable window panel is movable between a closed position, where said movable window panel is disposed at said opening, and an opened position, where said movable window panel is moved from the closed position away from the opening and at least partially along said fixed window panel;
   a drive system operable to move said movable window panel between the opened position and the closed position, wherein said drive system comprises a single flexible drive element that, when said drive system is actuated to move said movable window panel in a first direction, said flexible drive element pulls said movable window panel along said lower rail, and when said drive system is actuated to move said movable window panel in a second direction opposite the first direction, said flexible drive element pushes said movable window panel along said lower rail;
   wherein said single flexible drive element comprises a flexible tape;
   wherein said lower rail of said frame portion comprises a guide structure along said lower rail that receives said flexible tape;
   wherein an end region of said flexible tape connects to said movable window panel along said guide structure of said lower rail, and wherein said flexible tape, when said drive system is actuated to move said movable window panel between the opened position and the closed position, is moved along said guide structure of said lower rail; and
   wherein said guide structure of said lower rail limits flexing or bending of said flexible tape when said flexible drive element pushes said movable window panel along said lower rail.

2. The vehicular slider window assembly of claim 1, wherein said flexible tape, when said drive system is actuated to move said movable window panel toward the opened position, pulls said movable window panel along said lower rail, and wherein said flexible tape, when said drive system is actuated to move said movable window panel toward the closed position, pushes said movable window panel along said lower rail.

3. The vehicular slider window assembly of claim 1, wherein said guide structure defines a passageway along said lower rail, and wherein said flexible tape is received in the passageway along said lower rail, and wherein said guide structure limits flexing or bending of said flexible tape as said flexible tape is moved along said passageway.

4. The vehicular slider window assembly of claim 3, wherein said flexible tape is coiled around a spool when moved to pull said movable window panel, and wherein said flexible tape is uncoiled from said spool when moved to push said movable window panel.

5. The vehicular slider window assembly of claim 4, wherein said flexible tape extends between said spool and said movable window panel and along said guide structure of said lower rail.

6. The vehicular slider window assembly of claim 1, wherein said flexible tape comprises a U-shaped tape, and wherein said guide structure defines a correspondingly formed passageway that limits flexing or bending of said U-shaped tape.

7. The vehicular slider window assembly of claim 1, wherein said lower rail comprises a slot along said guide structure, and wherein a connector extends between and connects to the end region of said flexible tape and said movable window panel, and wherein the connector passes through and is movable along said slot.

8. The vehicular slider window assembly of claim 1, wherein said drive system comprises a drive motor that rotates a drive element to move said flexible tape, and wherein said drive element is disposed at an end region of said lower rail.

9. The vehicular slider window assembly of claim 8, wherein said flexible tape extends between said drive element and said movable window panel and along said guide structure of said lower rail.

10. The vehicular slider window assembly of claim 1, wherein said fixed window panel comprises a single fixed window panel having an opening therethrough.

11. A vehicular slider window assembly, said vehicular slider window assembly comprising:
   a frame portion having an upper rail and a lower rail;
   a fixed window panel that is fixed relative to said frame portion, said fixed window panel at least in part defining an opening;
   a movable window panel that is movable along said upper rail and said lower rail, wherein said movable window panel is movable between a closed position, where said movable window panel is disposed at said opening, and an opened position, where said movable window panel is moved from the closed position away from the opening and at least partially along said fixed window panel;
   a drive system operable to move said movable window panel between the opened position and the closed position, wherein said drive system comprises a single flexible drive element that, when said drive system is actuated to move said movable window panel toward the open position, said flexible drive element pulls said movable window panel along said lower rail, and when said drive system is actuated to move said movable window panel toward the closed position, said flexible drive element pushes said movable window panel along said lower rail;
   wherein said single flexible drive element comprises a U-shaped tape;
   wherein said lower rail of said frame portion comprises a guide structure along said lower rail that receives said U-shaped tape;
   wherein an end region of said U-shaped tape connects to said movable window panel along said guide structure of said lower rail, and wherein said U-shaped tape, when said drive system is actuated to move said movable window panel between the opened position and the closed position, is moved along said guide structure of said lower rail;
   wherein said guide structure of said lower rail limits flexing or bending of said U-shaped tape when said flexible drive element pushes said movable window panel along said lower rail; and
   wherein said guide structure defines a U-shaped passageway at least partially along said lower rail and limits flexing or bending of said U-shaped tape as said U-shaped tape moves along said U-shaped passageway.

12. The vehicular slider window assembly of claim 11, wherein said drive system comprises a drive motor that rotates a drive element to move said U-shaped tape, and wherein said drive element is disposed at an end region of said lower rail.

13. The vehicular slider window assembly of claim 12, wherein said drive motor rotatably drives a spool, and wherein, when said drive motor rotatably drives said spool in a first direction, said U-shaped tape is coiled around said spool to pull said movable window panel, and wherein, when said drive motor rotatably drives said spool in a second direction opposite the first direction, said U-shaped tape is uncoiled from said spool to push said movable window panel.

14. The vehicular slider window assembly of claim 13, wherein, when said drive motor rotatably drives said spool, an output gear of said drive motor rotates about an axis of rotation normal to an axis of rotation of said spool.

15. The vehicular slider window assembly of claim 12, wherein said U-shaped tape extends between said drive element and said movable window panel and along said guide structure of said lower rail.

16. The vehicular slider window assembly of claim 13, wherein said U-shaped tape extends between said spool and said movable window panel and along said guide structure of said lower rail.

17. The vehicular slider window assembly of claim 11, wherein said lower rail comprises a slot along said U-shaped passageway, and wherein a connector extends between and connects to the end region of said U-shaped tape and said movable window panel, and wherein the connector passes through and is movable along said slot.

18. The vehicular slider window assembly of claim 11, wherein said fixed window panel comprises a single fixed window panel having an opening therethrough.

\* \* \* \* \*